US009697603B2

(12) United States Patent
Reynolds et al.

(10) Patent No.: US 9,697,603 B2
(45) Date of Patent: Jul. 4, 2017

(54) MEDICAL IMAGE DATA PROCESSING SYSTEM AND METHOD FOR VESSEL SEGMENTATION USING PRE- AND POST-CONTRAST DATA

(71) Applicant: Toshiba Medical Systems Corporation, Otawara-shi (JP)

(72) Inventors: Steven Reynolds, Edinburgh (GB); Brian Mohr, Edinburgh (GB); Marco Razeto, Edinburgh (GB)

(73) Assignee: Toshiba Medical Systems Corporation, Otawara-shi (JP)

( * ) Notice: Subject to any disclaimer, the term of this patent is extended or adjusted under 35 U.S.C. 154(b) by 175 days.

(21) Appl. No.: 14/576,329

(22) Filed: Dec. 19, 2014

(65) Prior Publication Data
US 2016/0180525 A1    Jun. 23, 2016

(51) Int. Cl.
*G06T 7/00*    (2017.01)
*G06T 5/00*    (2006.01)
(Continued)

(52) U.S. Cl.
CPC ............ *G06T 7/0014* (2013.01); *G06T 5/009* (2013.01); *G06T 7/0016* (2013.01); *G06T 7/11* (2017.01);
(Continued)

(58) Field of Classification Search
None
See application file for complete search history.

(56) References Cited

U.S. PATENT DOCUMENTS

| 5,832,134 | A  | 11/1998 | Avinash et al. |
| 7,912,260 | B2 | 3/2011  | Breeuwer et al. |
| 8,023,711 | B2 | 9/2011  | Scheuering et al. |
| 2002/0181754 | A1 | 12/2002 | Masumoto et al. |

(Continued)

FOREIGN PATENT DOCUMENTS

| EP | 2 120 208 A1 | 11/2009 |
| JP | 2008-173236 | 7/2008 |
| WO | WO 2009/040719 A1 | 4/2009 |

OTHER PUBLICATIONS

Brieva et al. "A Level Set Method for Vessel Segmentation in Coronary Angiography," Proceedings of the IEEE, Engineering in Medicine and Biology, 27th Annual Conference, Shanghai, China, Sep. 1-4, 2005.*

(Continued)

*Primary Examiner* — Matthew Bella
*Assistant Examiner* — Soo Shin
(74) *Attorney, Agent, or Firm* — Oblon, McClelland, Maier & Neustadt, L.L.P.

(57) ABSTRACT

An image data processing apparatus comprises a data receiving unit for receiving medical image data representative of a region of a subject, wherein the medical image data comprises for each of a plurality of points in the region of the subject a first intensity value and a second intensity value, each point having a respective position on an at least two-dimensional distribution of first intensity against second intensity, and wherein for each point at least one of the first intensity value and the second intensity value is obtained from a contrast-enhanced scan of the region of the subject; and a processing unit for rendering or segmenting the medical image data in dependence on the positions of points in the at least two-dimensional distribution.

25 Claims, 13 Drawing Sheets

(51) Int. Cl.
*G06T 7/11* (2017.01)
*G06T 7/143* (2017.01)
*G06T 7/90* (2017.01)

(52) U.S. Cl.
CPC ............. *G06T 7/143* (2017.01); *G06T 7/90* (2017.01); *G06T 2207/10081* (2013.01); *G06T 2207/10088* (2013.01); *G06T 2207/10104* (2013.01); *G06T 2207/10108* (2013.01); *G06T 2207/20036* (2013.01); *G06T 2207/20076* (2013.01); *G06T 2207/20112* (2013.01); *G06T 2207/20161* (2013.01); *G06T 2207/20208* (2013.01); *G06T 2207/30048* (2013.01); *G06T 2207/30101* (2013.01)

(56) References Cited

U.S. PATENT DOCUMENTS

| | | | |
|---|---|---|---|
| 2004/0017370 A1 | 1/2004 | Miyamoto et al. | |
| 2004/0022359 A1* | 2/2004 | Acharya | A61B 6/405 378/98.11 |
| 2007/0230761 A1 | 10/2007 | Gundel et al. | |
| 2009/0022375 A1* | 1/2009 | Fidrich | G06K 9/6206 382/128 |
| 2011/0158491 A1* | 6/2011 | Markova | G06T 3/0081 382/128 |
| 2012/0038649 A1* | 2/2012 | Kanitsar | G06T 11/003 345/440 |
| 2014/0003701 A1* | 1/2014 | Masood | G06T 7/0012 382/134 |
| 2014/0355850 A1* | 12/2014 | Kelm | G06T 7/0083 382/128 |
| 2014/0355854 A1* | 12/2014 | Kelm | G06T 7/0083 382/131 |
| 2015/0161782 A1* | 6/2015 | Mohr | G06T 7/0091 382/128 |

OTHER PUBLICATIONS

Extended European Search Report issued on Apr. 26, 2016 in European Patent Application No. 15199571.9.
U.S. Appl. No. 14/099,092, filed Dec. 6, 2013, Mohr et al.
Zhang et al., "Soft Classification with Gaussian Mixture Model for Clinical Dual-Energy CT Reconstructions", the proceedings of the 12$^{th}$ International Meeting on Fully Three-Dimensional Image Reconstruction in Radiology and Nuclear Medicine, pp. 408-411, Lake Tahoe, California, Jun. 16-21, 2013.
Yan Yang, et al., "Knowledge-Based 3D Segmentation and Reconstruction of Coronary Arteries Using CT Images". IEEE Engineering in Medicine and Biology, vol. 3, pp. 1664-1666, Sep. 1-5, 2004.
J. Brieva, et al. "A Level Set Method for Vessel Segmentation in Coronary Angiography," IEEE Engineering in Medicine and Biology pp. 6348-6351, Sep. 1-4, 2005.
D. Vukadinovic, et al. "AdaBoost Classification for Model Based Segmentation of the Outer Wall of the Common Carotid Artery in CTA," In proceedings: SPIE, vol. 6914, SPIE 2008. 8 pages.
David Lesage, et al. "Medial-Based Bayesian Tracking for Vascular Segmentation: Application to Coronary Arteries in 3D CT Angiography," In Proceedings: IEEE International Symposium on Biomedical Imaging, pp. 268-271, 2008.
J. MacQueen, "Some Methods for Classification and Analysis of Multivariate Observations," Proceedings of the Fifth Symposium on Math, Statistics, and Probability, pp. 281-297, University of California Press, 1967.
Jose L. Marroquin et al. "Some Extensions of the K-Means Algorithm for Image Segmentation and Pattern Classification" AI Memo 1390, Massachusetts Institute of Technology, Cambridge, MA, Jan. 1993. 23 pages.
Tood K. Moon, "The Expectation-Maximization Algorithm" (Signal Processing Magazine, IEEE, vol. 13, p. 47-60, Nov. 1996.

* cited by examiner

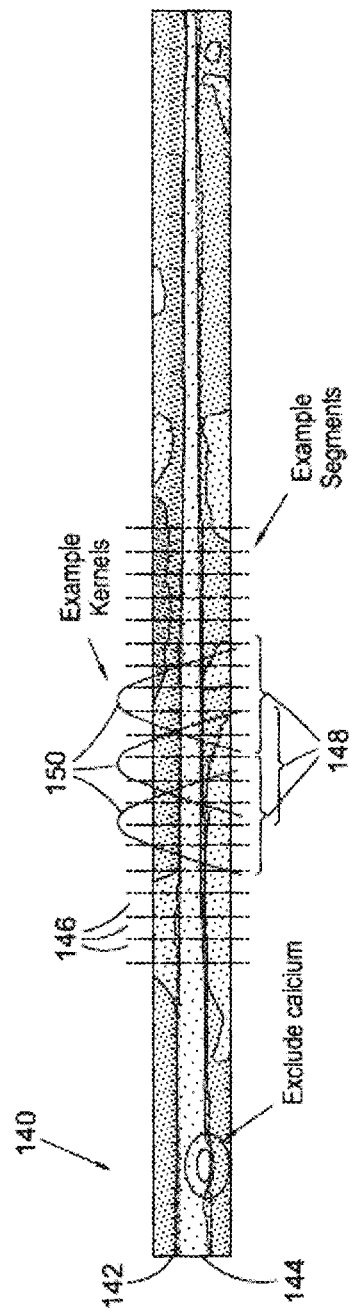

MEDICAL IMAGE DATA PROCESSING SYSTEM AND METHOD FOR VESSEL SEGMENTATION USING PRE- AND POST-CONTRAST DATA

FIELD

Embodiments described herein relate generally to a method of, and apparatus for, processing medical image data, for example a method and apparatus for rendering or segmenting medical image data.

BACKGROUND

Computed-tomography (CT) imaging is a widely used form of medical imaging which uses X-rays to obtain three-dimensional image data. A CT image data set obtained from a CT scan may comprise a three-dimensional array of voxels, each having an associated intensity which is representative of the attenuation of X-ray radiation by a respective, corresponding measurement volume. The attenuation of X-ray radiation by the measurement volume may be expressed as an intensity value or CT value in Hounsfield units (HU), where 0 HU is the CT value of water.

Applications for diagnosing coronary artery disease using CT are being developed. Such applications may be used to determine the extent of any atherosclerotic heart disease present in the vessels.

It is well-known to use a contrast agent to increase the intensity of blood vessels as viewed in a CT image. A current technique for diagnosing coronary artery disease uses a non-contrast cardiac scan (which may be called a non-enhanced or pre-contrast scan and which in some circumstances may comprise a calcium scoring scan) and a contrast-enhanced cardiac scan (which may be called a post-contrast scan). The two scans are registered together (for example, using automated non-linear or linear registration processes) and a derived scan comprising subtraction data is generated based upon the difference between the intensity data values at each corresponding position in the scans. The subtraction data can be used to assess the condition of the vessels.

In a single pre-contrast calcium scoring scan, calcifications and stents may be visible, but the vessels may be indistinguishable from other soft tissue. In a single contrast-enhanced CT scan, the measured Hounsfield values for contrast-enhanced blood may overlap with the Hounsfield values for calcifications and stents. If an image derived from contrast-enhanced scan data is displayed using standard window level or color mapping techniques, it may be difficult to distinguish between contrast-enhanced blood and calcifications or stents.

If the contrast-enhanced blood can be viewed alone, then it may be possible to determine the extent of coronary disease and measure vessel stenosis (abnormal constriction or narrowing of a vessel). Subtracting registered non-contrast data from the contrast-enhanced data may remove features that are common to the contrast-enhanced and non-contrast scan, for example bone or soft tissue, to leave parts of the contrast image that have been enhanced by the contrast agent.

FIG. 1 is a flowchart illustrating a known subtraction method. At stage 10, a non-contrast volume (pre-contrast study 100) and a contrast-enhanced volume (post-contrast study 101) are registered using a non-rigid registration technique. Deformation field 102 is obtained from the registration. Deformation field 102 relates coordinates in the coordinate system of the non-contrast volume 100 to coordinates in the coordinate system of the contrast-enhanced volume 101.

At stage 12, a registered non-contrast volume (registered pre-contrast study 103) is calculated using the deformation field 102 and the non-contrast volume 100. The locations of samples in the registered non-contrast volume 102 correspond with the location of samples of the contrast-enhanced volume 101.

At stage 14, a subtraction volume 104 is generated by subtracting Hounsfield values of samples in the registered non-contrast volume 103 from Hounsfield values of corresponding samples in the contrast-enhanced volume 101.

At stage 16, the subtraction volume 104 is rendered in a renderer to produce a rendered subtraction image 105.

The rendered subtraction image 105 may be an image in one of many visualization view types. For example, the rendered subtraction image 106 may be a 2D slice, a 2D multi-planar rendering (MPR) image, a MPR plus slab image, a curved MPR image, a shaded volume rendering (SVR) image or an Intensity Projection (IP) image (for example a Maximum Intensity Projection image, Minimum Intensity Projection image or Average Intensity Projection image).

The rendered subtraction image 105 is a grayscale image where the grayscale value of a given pixel is representative of the difference between the intensity of the point or points represented by that pixel in the registered non-contrast volume and the intensity of the point or points represented by that pixel in the contrast-enhanced volume. The subtraction volume 104 contains less information than the original volumes 100, 101 because the grayscale value of each pixel is representative of a difference value. For example, a difference value of 5 may result from intensity values of 5 and 10 HU, or from intensity values of 105 and 110 HU.

Subtraction images may be difficult to learn to read. When reading images of a single channel grayscale subtraction volume, there may be cases where it is difficult to distinguish between a real occlusion or stenosis in the vessel and an artifact caused by a failure in the registration. FIG. 2 shows a subtraction image on which has been marked a dashed ellipse 17 containing a part of the subtraction image that is representative of a heavily calcified coronary artery, which may be difficult to read because of the difficulty in distinguishing between stenosis and image artifacts. Determining whether contrast is flowing through a vessel can be difficult when there is a lot of calcification.

Segmentation is the process of identifying pixels or voxels representing a given structure in an image, and may further include separating the pixels or voxels from the rest of the image. The structure may be, for example, an anatomical structure such as a vessel or an organ, or an artificial structure such as a stent. The identification and/or separation of pixels or voxels representing the structure may facilitate further processing of information relating to the structure, for example, measurement of the structure, or rendering the structure in a way that is distinct from other structures in the image.

Segmentation of blood vessels may be used in identifying diseased regions of the vessels, for example regions displaying calcifications. Accurate segmentation of the vessel lumen and vessel wall may be required in order to perform stenosis measurements, for example in the coronary arteries.

It may be difficult to obtain accurate and robust vessel segmentation, particularly in coronary vessels. Smaller vessels may be near the limit of detector resolution, and may therefore be difficult to segment. Segmentation of the vessel wall may be difficult, for example because of similarities between the intensities of vessel wall and of other soft tissue. Some known segmentation methods for classifying vessels in subtraction may depend on very accurate registration and may have no awareness of registration errors.

Automatic or semi-automatic vessel tracking algorithms may be used to track vessels within imaging data. However, tracking and segmenting vessels in contrast-enhanced data may be difficult because of the similarity between the intensity of contrasted blood in the vessel lumen and the intensity of calcium in calcifications.

Blooming may obfuscate calcifications, and may complicate lumen classification, particularly in the presence of calcifications or stents. Blooming is a type of image artifact which makes a region of calcification (or a stent) look larger than its true physical extent. Blooming may be due to a combination of artifacts such as beam hardening and motion. It is known that blooming may be more significant in contrast-enhanced images than in non-contrast images.

FIGS. 3(a) and 3(b) are representative of the results of a known coronary vessel segmentation method that has been performed on a contrast image. A large calcium deposit is present in the vessel to be segmented.

FIGS. 3(a) and 3(b) show two different views of a set of coronary computed tomography angiography (CCTA) image data showing a coronary vessel in which a contrast agent is present. FIG. 3(a) shows a straightened vessel view along the vessel centerline. FIG. 3(b) shows a cross-section of the vessel taken perpendicular to the centerline. A large calcium deposit 20 can be seen in both views as an area of high intensity.

A lumen segmentation has been performed on the image data corresponding to FIGS. 3(a) and 3(b), using the known coronary vessel segmentation method. The bounds of the segmentation are shown in each of FIGS. 3(a) and 3(b) as lines 18.

The extent of the lumen was also assessed by a clinician using the same image data. The automatically segmented lumen boundary of line 18 was found to be smaller than the lumen area that was assessed by the clinician. The size of the vessel lumen was underestimated in this known method of segmentation of the contrasted data set, due to the presence of the large calcium deposit 20.

Clinicians may not fully trust some current methods of automated algorithmic segmentation. If automatic or semi-automatic vessel segmentation underestimates or overestimates the lumen then the results of the segmentation algorithm may not provide a benefit to the clinician.

BRIEF DESCRIPTION OF THE DRAWINGS

Embodiments are now described, by way of non-limiting example, and are illustrated in the following figures, in which:

FIG. 7b is an overlay of the joint histogram of FIG. 6 and the transfer function of FIG. 7a;

FIG. 13 shows a schematic representation of an imaged blood vessel to which a classification process has been applied.

DETAILED DESCRIPTION

Certain embodiments provide an image data processing apparatus comprising a data receiving unit for receiving medical image data representative of a region of a subject, wherein the medical image data comprises for each of a plurality of points in the region of the subject a first intensity value and a second intensity value, each point having a respective position on an at least two-dimensional distribution of first intensity against second intensity, and wherein for each point at least one of the first intensity value and the second intensity value is obtained from a contrast-enhanced scan of the region of the subject. The image data processing apparatus further comprises a processing unit for rendering or segmenting the medical image data in dependence on the positions of points in the at least two-dimensional distribution.

The rendering of the medical image data may comprise generating a rendered image in which points that are representative of a first tissue type or artifact may be visually distinguished from points that are representative of a second, different tissue type or artifact. Points representative of the first tissue type or artifact may have positions in a first region of the at least two-dimensional distribution and points representative of the second tissue type or artifact may have positions in a second, different region of the at least two-dimensional distribution.

The segmenting of the medical image data may comprise determining a respective cluster region in respect of each of a plurality of clusters of the points on the two-dimensional distribution, wherein each cluster of points is associated with a respective tissue type or artifact, obtaining at least one classification for each point based on whether the position of the point on the two-dimensional distribution falls inside one or more of the cluster regions, and segmenting at least one structure in the medical image data in dependence on the obtained classifications.

Certain embodiments provide an image data processing method comprising receiving medical image data representative of a region of a subject, wherein the medical image data comprises for each of a plurality of points in the region of the subject a first intensity value and a second intensity value, each point having a respective position on an at least two-dimensional distribution of first intensity against second intensity, and wherein for each point at least one of the first intensity value and the second intensity value is obtained from a contrast-enhanced scan of the region of the subject, and rendering or segmenting the medical image data in dependence on the positions of points in the at least two-dimensional distribution.

Figure 1:
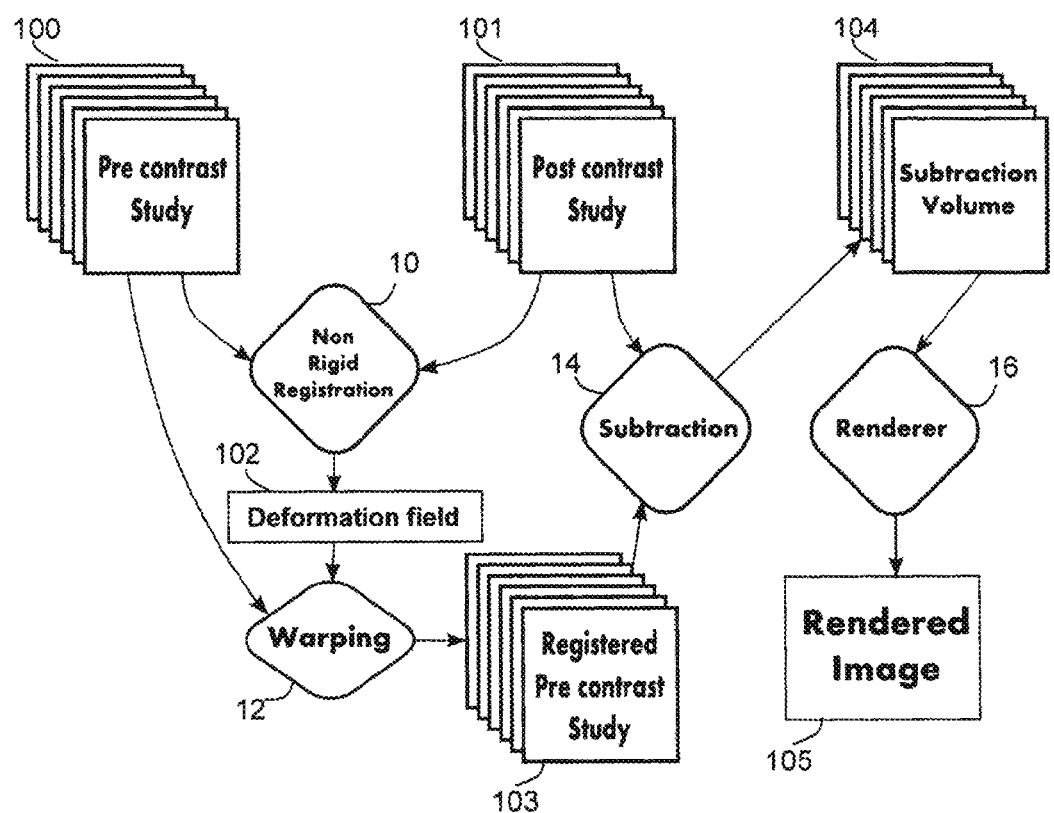
FIG. 1 is a flowchart illustrating in overview a prior art subtraction process.
Figure 2:
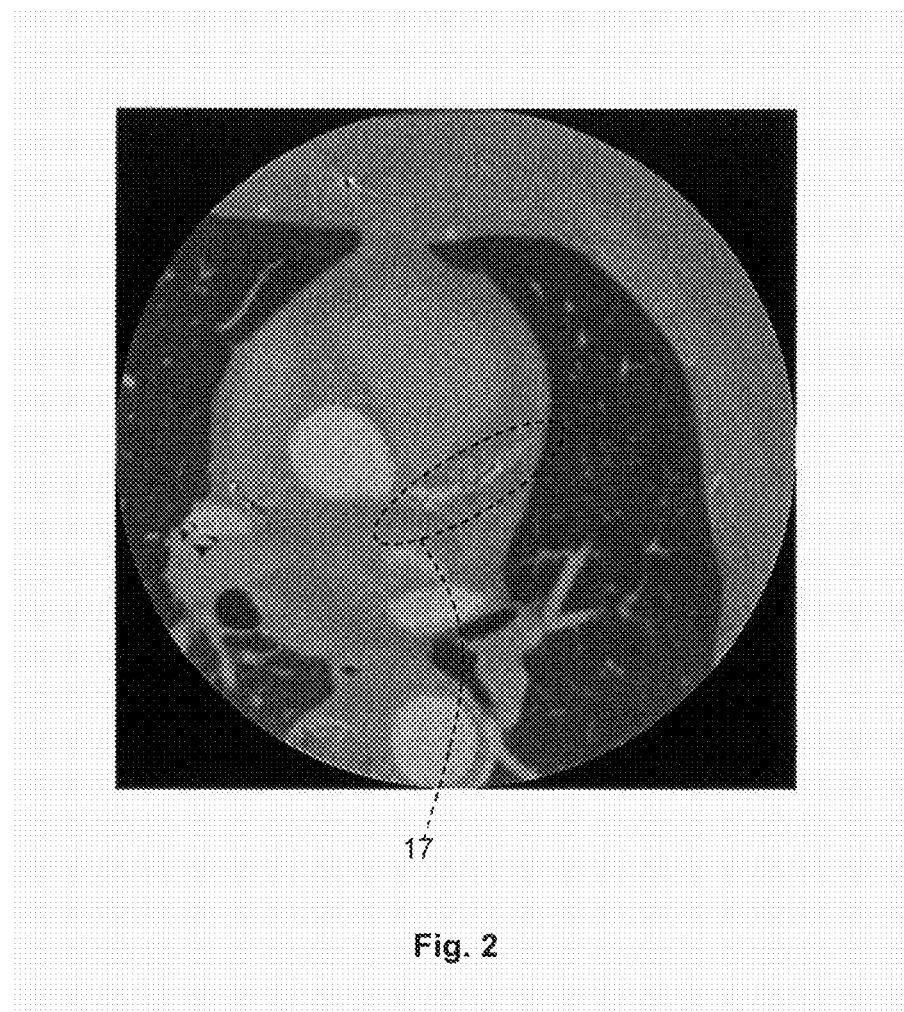
FIG. 2 is a subtraction image in which a heavily calcified artery is highlighted.
Figures 3A, 3B:
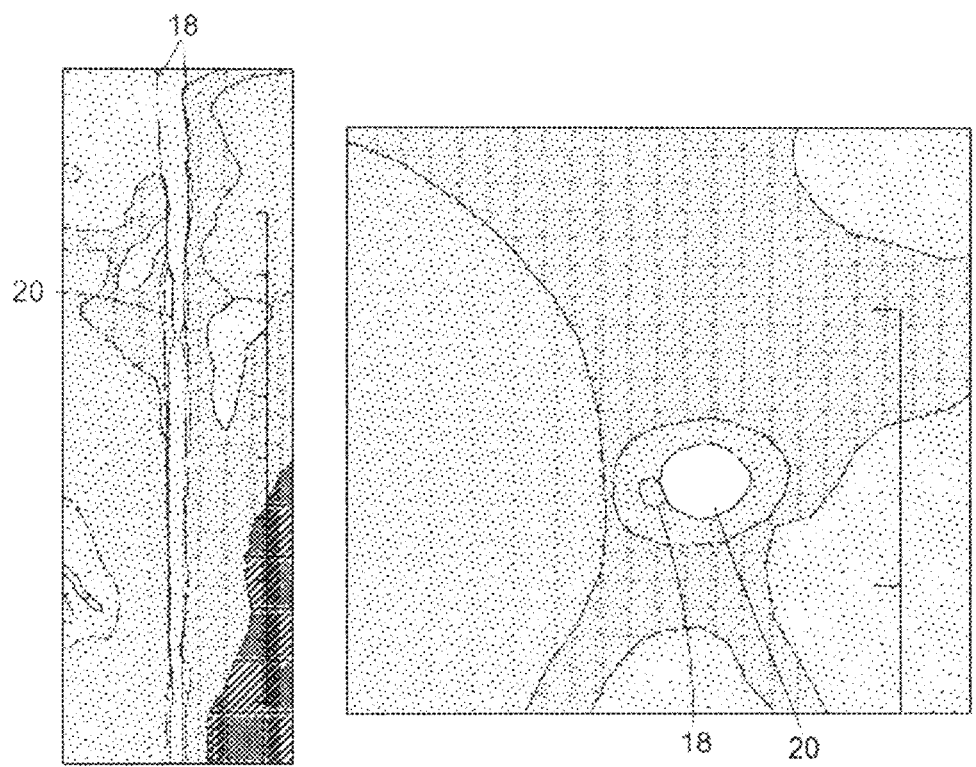
FIGS. 3(a) and 3(b) show the results of an exemplary known vessel segmentation in contrast-enhanced image data.
Figure 4:
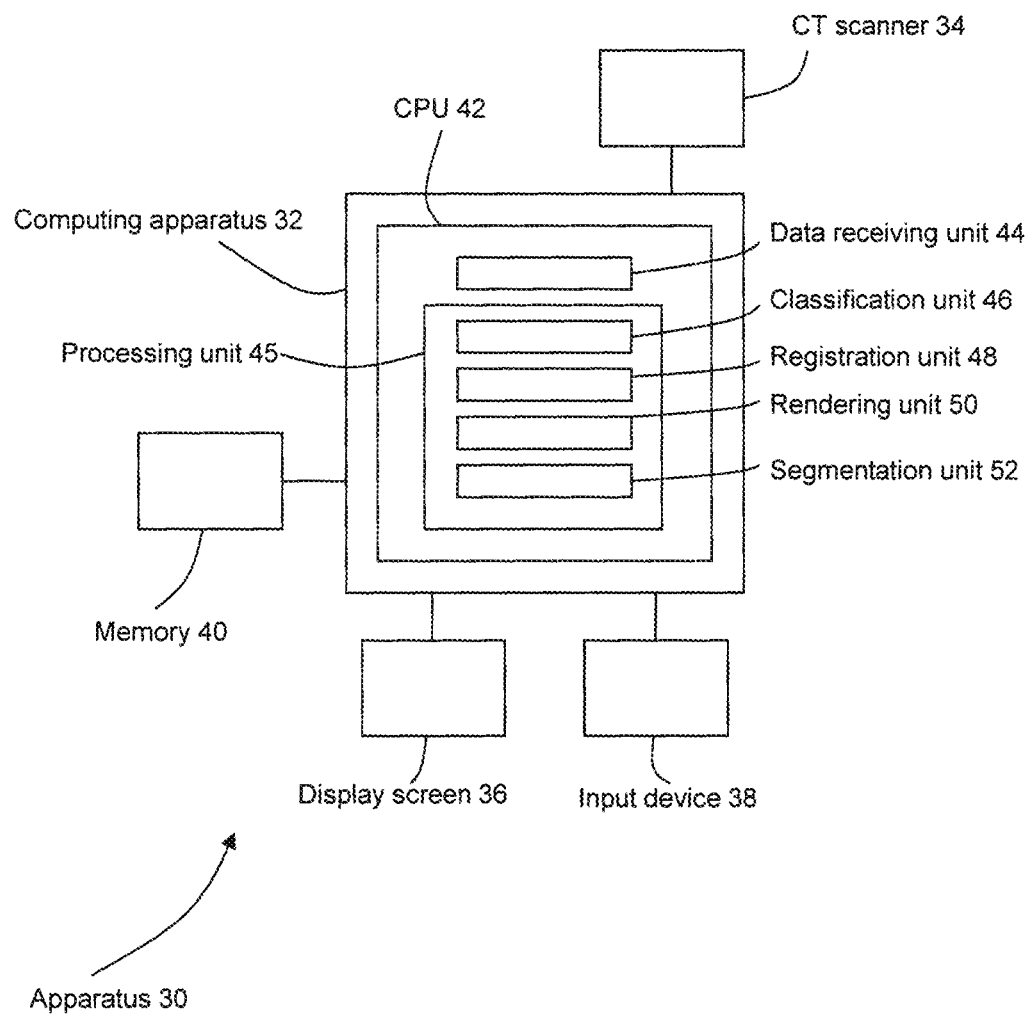
FIG. 4 is a schematic illustration of an apparatus according to an embodiment.

An image data processing apparatus 30 according to an embodiment is illustrated schematically in FIG. 4. The image data processing apparatus 30 comprises a computing apparatus 32, in this case a personal computer (PC) or workstation, which is connected to a CT scanner 34, one or more display screens 36 and an input device or devices 38, such as a computer keyboard, mouse or trackball.

The CT scanner 34 may be any CT scanner that is configured to obtain suitable image data. In alternative embodiments, the CT scanner 34 may be replaced or supplemented by a scanner in any other imaging modality, for example an MRI (magnetic resonance imaging) scanner, X-ray scanner, PET scanner (positron emission tomography) or SPECT (single photon emission computed tomography) scanner.

In the present embodiment, sets of image data obtained by the CT scanner 34 are stored in memory 40 and subsequently provided to computing apparatus 32. In an alternative embodiment, sets of image data are supplied from a remote data store (not shown) which may form part of a Picture Archiving and Communication System (PACS). The memory 40 or remote data store may comprise any suitable form of memory storage.

Computing apparatus 32 provides a processing resource for automatically or semi-automatically processing sets of image data. Computing apparatus 32 comprises a central processing unit (CPU) 42 that is operable to load and execute a variety of software modules or other software components that are configured to perform the method that is described below with reference to FIG. 5, and the method that is described below with reference to FIGS. 11 and 12.

The computing apparatus 32 includes a data receiving unit 44 and a processing unit 45. In the present embodiment, the processing unit 45 comprises a classification unit 46, a registration unit 48 (which may be called a registration engine), a rendering unit 50 (which may be called a rendering engine), and a segmentation unit 52.

In the present embodiment, the data receiving unit 44 and processing unit 45 are each implemented in computing apparatus 32 by means of a computer program having computer-readable instructions that are executable to perform the method of the embodiment. However, in other embodiments, the various units may be implemented as one or more ASICs (application specific integrated circuits) or FPGAs (field programmable gate arrays).

The computing apparatus 32 also includes a hard drive and other components of a PC including RAM, ROM, a data bus, an operating system including various device drivers, and hardware devices including a graphics card. Such components are not shown in FIG. 4 for clarity.

Figure 5:
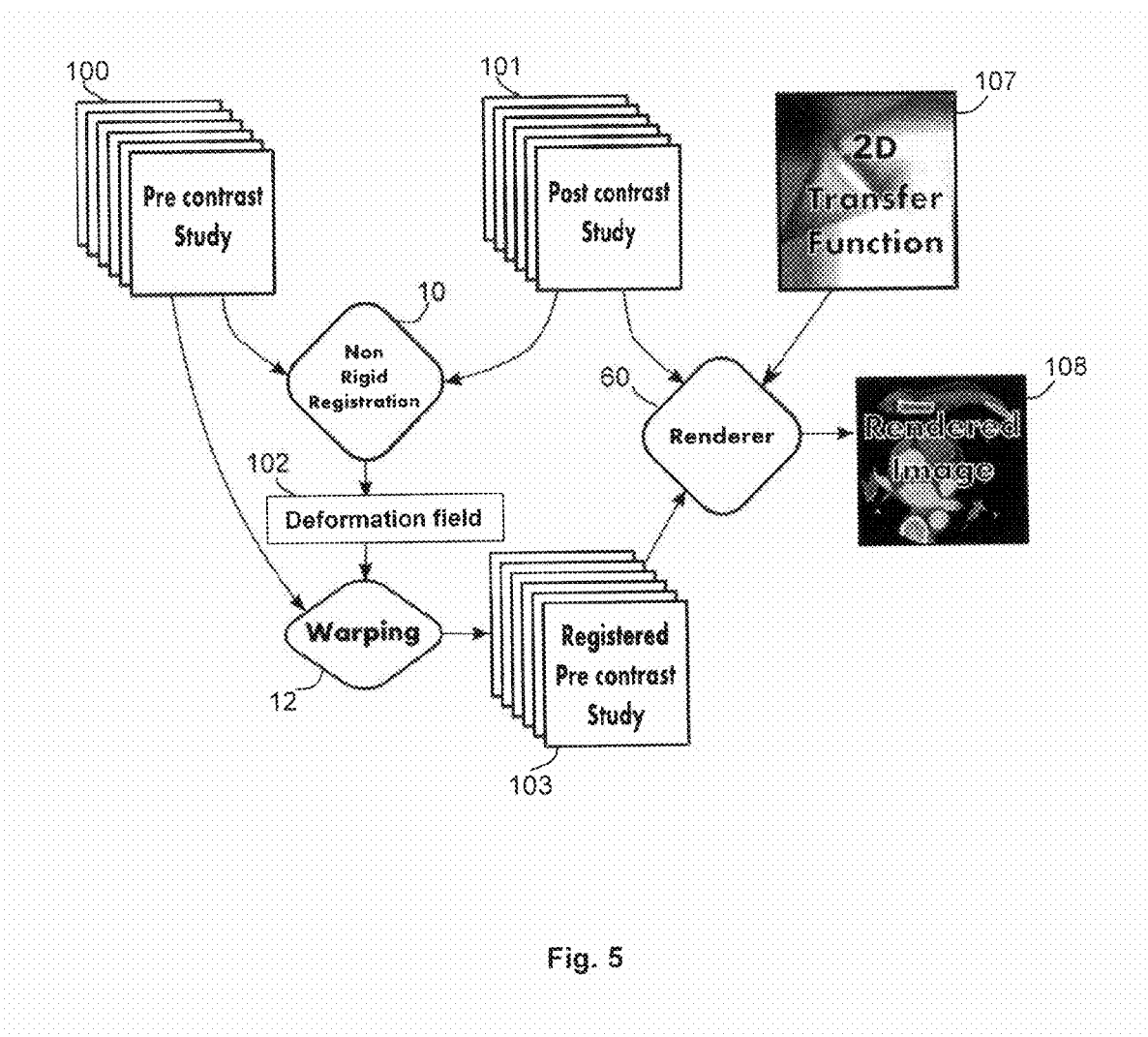
FIG. 5 is a flow chart illustrating in overview a process performed in accordance with an embodiment.

The system of FIG. 4 is configured to perform a series of stages as illustrated in overview in the flow chart of FIG. 5. The system of FIG. 4 is also configured to perform a series of stages as illustrated in overview in the flow chart of FIG. 11 or FIG. 12.

Turning to FIG. 5, at stage 10, data receiving unit 44 receives a set of non-contrast image data (pre-contrast volume 100) and a set of contrast-enhanced image data (post-contrast volume 101) from the memory store 40 or from a remote data store, or from the scanner 34 directly. The non-contrast image data 100 and contrast-enhanced image data 101 are representative of a region of a subject. In the present embodiment, the region is the coronary arteries and the subject is a human patient. The non-contrast image data 100 is a calcium score scan of the coronary arteries of the patient. The contrast image data 101 comprises volumetric image data also representing the coronary arteries of the same patient.

In other embodiments the non-contrast data may be data in which some contrast may be present but at significantly lower levels than for the contrast-enhanced data (for example, data from perfusion studies). In some embodiments, the non-contrast data may be data in which contrast is present, but is in another anatomical location from the anatomical location of interest. For example, in a study of the coronary vessels, the contrast may be present in the heart but may not yet have reached the coronary vessels.

In alternative embodiments, the non-contrast image data 100 and contrast-enhanced image data 101 may be derived from scans of any appropriate anatomical region. In some embodiments, the non-contrast image data 100 and contrast-enhanced image data are derived from scans of any appropriate vasculature, for example, cardiac, head or neck, run-off or lung.

In further embodiments, any data from any two or more appropriate scans may be used. Both scans may have contrast present. For example, two scans from a perfusion study may be used.

In some embodiments, data receiving unit 44 receives sets of data that have been obtained from dynamic contrast enhanced (DCE) imaging, for example from a DCE scan of the liver. In a DCE scan of the liver, contrast may move about through various phases of the DCE imaging.

In the present embodiment, the non-contrast image data and contrast-enhanced image data comprise CT data. In other embodiments, the non-contrast image data and contrast-enhanced image data may comprise data from an alternative modality, for example MR data. In some embodiments, the non-contrast image data and contrast-enhanced image data may each comprise a combination of MR and CT data. The MR may help to distinguish tissues that have the same HU value in CT.

The non-contrast image data 100 and contrast-enhanced image data 101 each comprise intensity values for a plurality of voxels.

The data receiving unit 44 passes the non-contrast image data 100 and contrast-enhanced image data 101 to the processing unit 45. Within the processing unit 45, the non-contrast image data 100 and contrast-enhanced image data 101 are passed to registration unit 48, which automatically registers the non-contrast image data 100 and contrast-enhanced image data 101 using non-rigid registration. Any suitable non-rigid registration method may be used, for example the method described in Razeto, M., Mohr, B., Arakita, K., Schuijf, J. D., Fuchs, A., Kühl, J. T., Chen, M. Y., and Kofoed, K. F., "Accurate, fully-automated registration of coronary arteries for volumetric CT digital subtraction angiography," Proc. SPIE 9034, 90343F-90343F-7 (2014).

In other embodiments, the registration may be performed using any suitable registration method, for example, any suitable method of non-rigid registration, rigid registration or affine registration. The registration method may be tuned to a particular anatomy (for example, the coronary arteries).

The non-rigid registration results in a deformation field 102 which relates points in the coordinate space of the non-contrast image data 100 to points in the coordinate space of the contrast-enhanced image data 101.

At stage 12, the registration unit 48 applies the deformation field 102 to the non-contrast image data 100 to produce registered non-contrast image data 103. The registered non-contrast image data 103 comprises a plurality of voxels at the same voxel positions as those of the contrast-enhanced image data 101. Each of the voxels may be said to have a first intensity value and a second intensity value, where the first intensity value is the intensity value for that voxel from the registered non-contrast image data 103, and the second intensity value is the intensity value for that voxel in the contrast-enhanced image data 101.

In alternative embodiments, the registration is performed in the opposite direction, and the registration unit 48 applies the deformation 102 to the contrast-enhanced image data 101.

Although in the present embodiment, registered non-contrast image data 103 is calculated upfront at stage 12, in other embodiments registered non-contrast image data 103 is not calculated at this stage. In such embodiments, no cached version of the registered non-contrast image data 103 is stored, and the deformation field 102 and non-contrast image data 100 may be used to generate appropriate samples of the non-contrast image data as needed.

In some embodiments, the non-contrast image data 100 and contrast-enhanced image data 101 are already registered before being received by data receiving unit 44 and no registration is required. In such embodiments, no registration is performed at stage 10, stage 12 is omitted and the registered non-contrast image data 103 is the same as the non-contrast image data 100 that was received at stage 10.

Although in the present embodiment the registered non-contrast image data 103 and contrast-enhanced image data 101 are separate data sets, in other embodiments a single data set may comprise registered data from a non-contrast scan and a corresponding contrast-enhanced scan, or the non-contrast data and/or contrast-enhanced data may be held in multiple data sets.

At stage 60, the rendering unit 50 receives the registered non-contrast image data 103 and contrast-enhanced image data 101. The rendering unit 50 receives a 2D transfer function 107 from classification unit 46. In other embodiments, any suitable table or function may be used instead of a 2D transfer function. The transfer function may have more than two dimensions.

The 2D transfer function is used to assign a color and/or opacity to each voxel pair (where a voxel pair comprises a voxel in the registered non-contrast image data 103 and the corresponding voxel in the contrast-enhanced image data 101). Each voxel pair has a first intensity value (intensity value from the registered non-contrast image data 103) and a second intensity value (intensity value from the contrast-enhanced image data 101). The 2D transfer function is used to assign a color to each voxel pair in dependence on the first intensity value and second intensity value of the voxel pair.

In the present embodiment, the classification unit 46 determines the 2D transfer function by plotting first and second intensity values from the registered non-contrast image data 103 and contrast-enhanced image data 101 as a joint histogram, automatically determining a plurality of histogram regions in the joint histogram, and assigning colors to the determined histogram regions, as described below.

Figure 6:
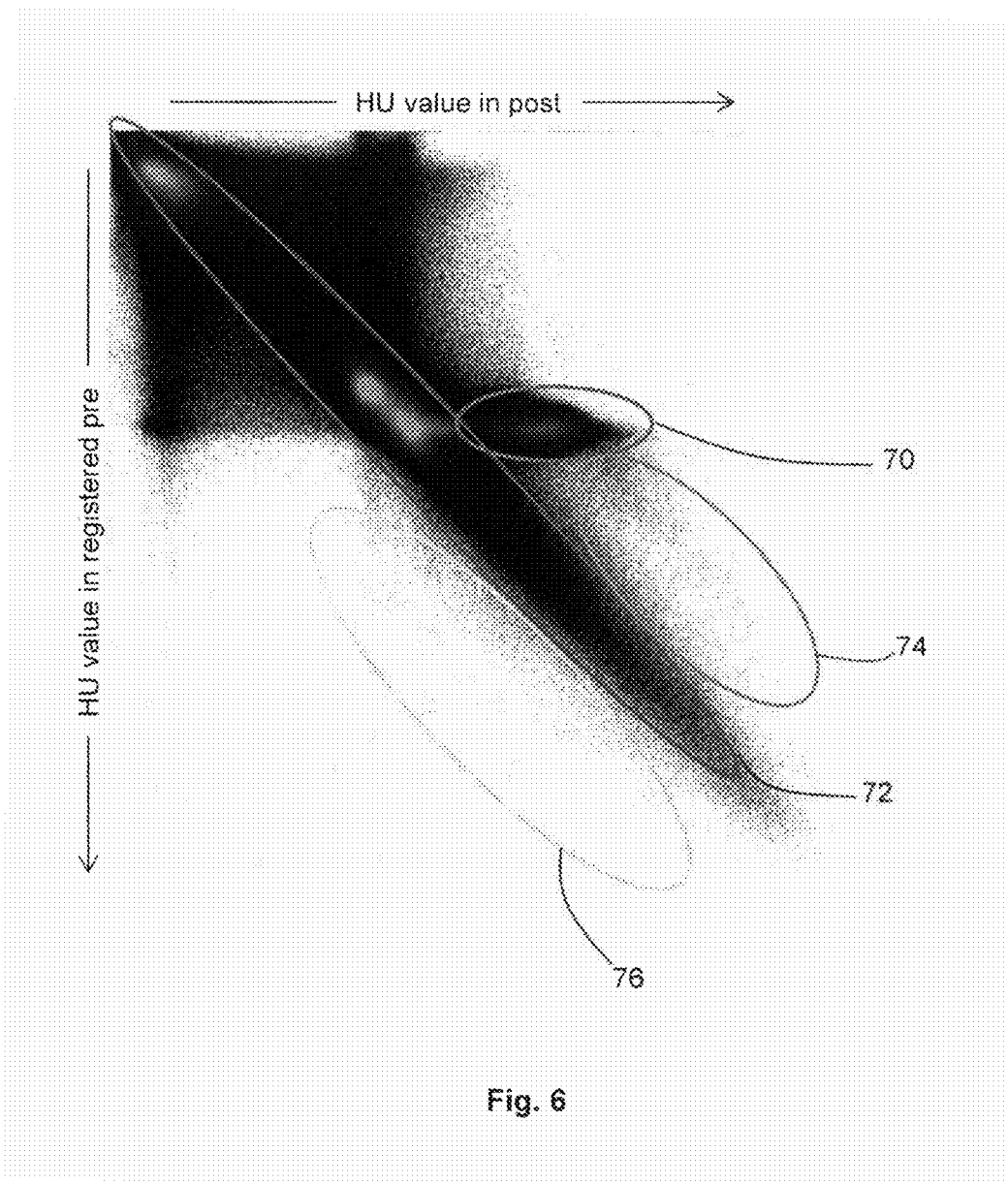
FIG. 6 is a joint histogram plot showing regions identified as lumen, unenhanced tissue, misregistration and blooming.

FIG. 6 shows the frequency distribution of intensity values from voxel pairs in the registered non-contrast image data 103 and contrast-enhanced image data 101 on a joint histogram plot. The vertical axis of the joint histogram represents first intensity value (intensity value in the registered non-contrast image data 103), in Hounsfield units. The horizontal axis of the joint histogram represents second intensity value (intensity value in the contrast-enhanced image data 101), in Hounsfield units.

The joint histogram comprises a plurality of two-dimensional bins of equal size. Each voxel pair has a pair of first intensity value and second intensity value (non-contrast intensity and contrast-enhanced intensity) that falls into a two-dimensional bin in the joint histogram 200. One may say that each voxel pair in the image data is assigned to a bin corresponding to its pair of first and second intensity values. Each voxel pair has a respective position on the two-dimensional distribution of first intensity against second intensity.

The number of voxel pairs in a bin is represented by the coloring of the bins in FIG. 6. Bins which contain no voxel pairs are white. Bins containing few voxel pairs are light gray, with bins becoming darker gray as more voxels are added. Bins that contain a very high number of voxel pairs are colored in orange.

The joint histogram plots the first intensity value of each voxel (intensity in the registered non-contrast image data 103) against the second intensity value of the voxel (intensity in the contrast-enhanced image data 101). Different materials (for example, different tissue types) may have different first intensities and/or different second intensities. Therefore, voxel pairs that are representative of different types may be allocated to bins in different regions of the joint histogram. A plurality of voxel pairs that are representative of the same tissue type may form a cluster in a particular area of the joint histogram.

If two registered data sets without contrast image were plotted on a joint histogram plot, it would be expected that values would cluster on the diagonal (with some variation for noise, and any variation resulting from misregistration). Voxel pairs representative of air may be expected to lie in bins at the top left of the plot (low intensity in both scans), soft tissue in the middle of the plot, and bone towards the bottom right (high intensity in both scans).

When contrast is added, a spur may be seen in the joint histogram plot which extends from the soft tissue values to the right (with a different position along the contrast-enhanced intensity axis for different amounts of contrast).

In the present embodiment, the assumption is made that the voxel pairs that are representative of a given tissue type form a cluster of points having a 2D Gaussian distribution in the joint histogram, and a 2D Gaussian function is fitted to the cluster to determine the distribution.

Similarly, voxel pairs resulting from particular image artifacts may occur at particular regions of the joint histogram, and the voxel pairs resulting from a given type of image artifact are assumed to form a cluster of points having a 2D Gaussian distribution in the joint histogram. A 2D Gaussian function is fitted to the cluster to determine the distribution.

The classification unit 46 determines means, variance and weights for each of four Gaussian distributions, which may be called lumen, unenhanced tissue, blooming and misregistration distributions. By determining the means, variances and weights for the distributions, the classification unit 46 determines a respective cluster region for each of the corresponding clusters of points on the joint histogram. Each cluster region may represent the location and extent of the corresponding cluster of points.

In the present embodiment, the classification unit 46 uses the k-means algorithm in conjunction with the Expectation Maximization (EM) algorithm to determine the means, variances and weights of the Gaussian distributions. In other embodiments, any suitable technique may be used to determine the means, variances and weights. In some embodiments, the 2D distributions may not be Gaussian.

The four determined Gaussian distributions (lumen, unenhanced tissue, blooming and misregistration) are indicated by ellipses 70, 72, 74 and 76 of FIG. 6, and are considered in turn below. Ellipses 70, 72, 74, 76 do not indicate the determined Gaussian distributions precisely, but rather are general indicators of the regions of interest in which the Gaussian distributions occur.

The lumen distribution (ellipse 70) is a distribution of voxel pairs that are representative of contrast-enhanced blood. Voxel pairs representative of contrast-enhanced blood are expected to have a higher second intensity than first intensity (a higher intensity in the contrast-enhanced image data than in the non-contrast image data), since the purpose of adding contrast is to enhance the intensity of blood. As the amount of contrast may vary within a vessel or between vessels, the amount of intensity enhancement may also vary. Therefore voxel pairs representative of contrast-enhanced blood may be expected to cluster on the joint histogram plot as a spur which lies parallel to the horizontal axis.

The unenhanced tissue distribution (ellipse 72) is a distribution of voxel pairs for which the intensity value is substantially unchanged between the non-contrast scan and the contrast-enhanced scan (the first intensity is approximately equal to the second intensity). Voxel pairs for which the intensity value is substantially unchanged will lie on or around the diagonal of the joint histogram (where the diagonal is the line on which non-contrast intensity is equal to contrast-enhanced intensity). Some variation from the diagonal may occur as a result of noise, or as a result of misregistration.

The blooming distribution (ellipse 74) is a distribution of voxel pairs for which the second intensity value (intensity in the contrast-enhanced image data) is greater than the first intensity value (intensity in the non-contrast image data), but for which the first intensity value does not fall within an expected range of non-contrast intensities for blood. The blooming distribution includes voxel pairs representative of blooming and also includes voxel pairs with an increase in intensity that is caused by a misregistration. Blooming is expected to be greater in contrast-enhanced image data than in non-contrast image data.

The misregistration distribution (ellipse 76) is a distribution of voxel pairs for which the second intensity value (intensity in the contrast-enhanced image data) is less than the first intensity value (intensity in the non-contrast image data). Since it is not expected that any anatomical regions should decrease in intensity when contrast is added, voxels exhibiting a decrease in intensity between the non-contrast scan and the contrast-enhanced scan may correspond with areas of potential registration inaccuracies. That is, if a voxel in the non-contrast scan has a higher intensity than the voxel that it is supposed to correspond to in the contrast-enhanced scan, it may be the case that the correspondence between the voxels (the registration) has been determined incorrectly.

If an object in the image data (for example, a calcification) is misregistered, it may be expected that there will be voxels at one side of the object that appear to increase in intensity from the non-contrast image data to the contrast-enhanced image data and voxels on the other side of the object that appear to decrease in intensity from the non-contrast image data to the contrast-enhanced image data. In reality there may be no change in intensity, but an error in the registration that results in voxels that are part of the calcification being incorrectly mapped to voxels that are not part of the calcification.

Once the means, variances and weights for the four Gaussian distributions (lumen, unenhanced tissue, blooming and misregistration) have been determined, the classification unit 46 uses the determined distributions (the determined location and extent of each of the clusters of points on the histogram) to determine the 2D transfer function 107. The 2D transfer function 107 is a mapping of color values to pairs of intensity values (non-contrast intensity, contrast intensity) such that voxel pairs that are part of one distribution may be distinguished from voxel pairs that are part of another distribution when an image is rendered from the image data using the transfer function.

Figure 7A:
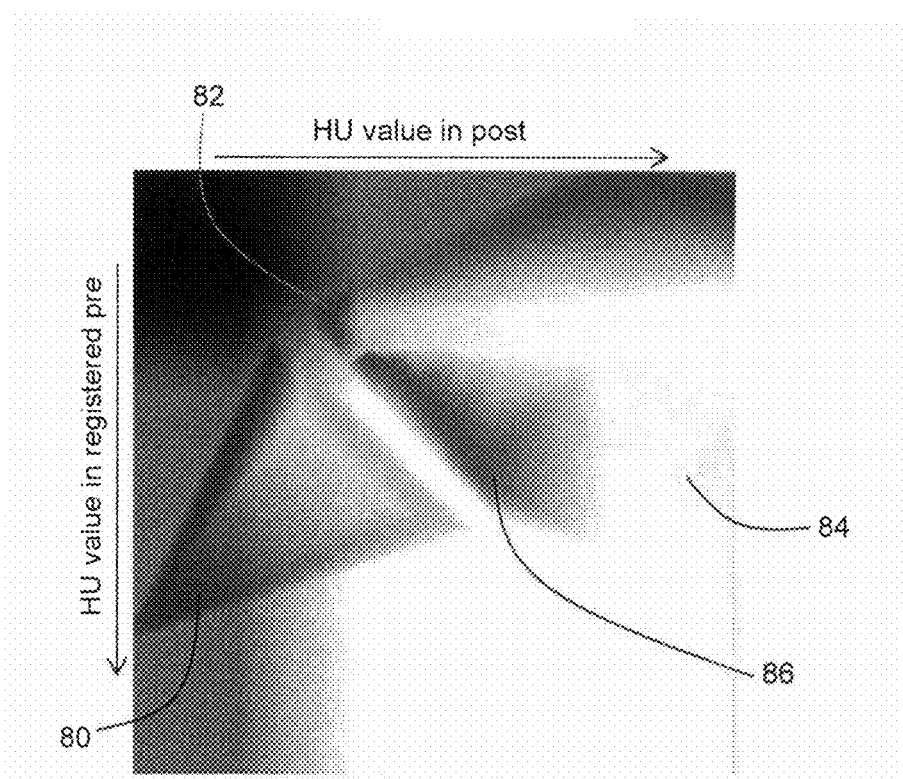
FIG. 7a is a transfer function showing colors to be mapped onto the joint histogram of FIG. 6.

In the present embodiment, the classification unit 46 determines a 2D transfer function 107 by determining a plurality of regions on the joint histogram (regions 80, 82, 84 and 86). The 2D transfer function 107 is represented in FIG. 7a.

Region 80 is a triangular region of the joint histogram. Region 80 includes voxel pairs which exhibit a decrease in intensity from the non-contrast image data to the contrast-enhanced image data. Region 80 includes at least some of the misregistration distribution 76 (note that the scale of FIG. 7a is different from the scale of FIG. 6).

Region 82 is a triangular region of the joint histogram. Region 82 includes voxel pairs that are representative of soft tissue with some enhancement. Region 82 may include at least some of lumen distribution 70 and/or may be located with reference to lumen distribution 70.

Region 84 is representative of voxel pairs having increased intensity in the contrast-enhanced image data. Region 84 includes at least some of lumen distribution 70, particularly areas of high contrast.

Region 86 is representative of voxel pairs having an increase in intensity between the non-contrast image data and the contrast-enhanced image data, where the non-contrast intensity is higher than the non-contrast intensity of blood. Region 86 includes at least some of blooming distribution 74.

Figure 7B:
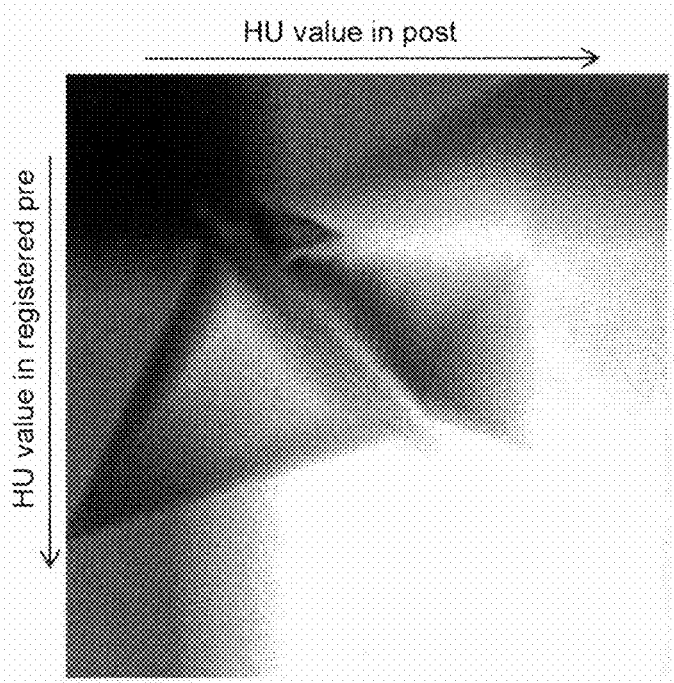

FIG. 7b shows the joint histogram of FIG. 6 overlaid on the transfer function of FIG. 7a. FIG. 7b shows how different regions of the transfer function correspond to different clusters of points in the joint histogram.

In the present embodiment, region 80 is colored in green, region 82 is colored in red, region 84 is colored in yellow and region 86 is colored in magenta. Red and yellow are used to show primary contrast enhancement.

In the present embodiment, the classification unit 46 generates the 2D transfer function in two stages. The classification unit 46 generates a grayscale layer to correspond to the average gray value for a particular pair of Window/Level ramps for the x axis and y axis.

The classification unit 46 then generates a second layer using a simple triangle mesh. Each vertex of the triangle mesh has a color and opacity value. Pixels in the second layer each have their color and opacity determined by interpolating between containing vertices in the triangle mesh.

The second layer is then composited over the grayscale table to give the final 2D transfer function. The compositing of the first and second layer may comprise alpha blending. The grayscale layer makes areas of non-contrast enhancement look similar to the same areas when viewed in a standard 2D slice viewer.

In other embodiments, the 2D transfer function may be generated using any suitable method, which may be automated or manual.

Each region of the joint histogram may have some color variation within the region, for example a brighter color at the center of the region than at the edges of the region. In other embodiments, any colors or optical properties may be used (for example, as well as color a region may be made dull, shiny or transparent). Different determined regions of the joint histogram may overlap, in which case the colors or optical properties may be combined in any appropriate manner. For example, the colors may be averaged. In the present embodiment, the color blending represents the closeness to a given region of the histogram.

The classification unit 46 also determines a grayscale ramp in x and in y which is also included in the transfer function 107. A ramp does not usually cover the full range of intensity data but may be configured such that values change over a range of interest. While in the present embodiment, a ramp (linear change) is used, in other embodiment a non-linear change may be used. Determining the range of interest may be referred to as window-leveling. The classification unit 46 may perform window-leveling on the image data to determine the grayscale ramp. The transfer function 107 may be set up to show a window-leveled view of either the registered non-contrast image data 103, the contrast-enhanced image data 101, or a combination of the registered non-contrast image data 103 and contrast-enhanced image data 101.

In the present embodiment, the 2D transfer function 107 is determined automatically by the classification unit 46 based on the registered non-contrast image data 103 and contrast-enhanced image data 101. In other embodiments, the 2D transfer function 107 may be wholly or partly determined by a user. For example, in one embodiment, the classification unit 46 displays the joint histogram, for example on display screen 36. A user finds the visible peaks and spurs, and defines boundaries of the appropriate regions of the joint histogram, for example by highlighting the regions using a mouse 38. The classification unit 46 determines regions 80, 82, 84 and 86 based on the regions that are defined by the user.

In the present embodiment, four Gaussian distributions are determined from the joint histogram. In other embodiments, any suitable number of distributions may be determined. Each distribution may represent any appropriate region of the joint histogram, for example any region containing voxel pairs representative of a tissue type, or any region containing voxel pairs representative of an artifact.

In some embodiments, the classification unit 46 automatically determines lumen, unenhanced tissue, blooming and misregistration distributions and displays a representation of those distributions on the joint histogram. The user then determines regions of the 2D transfer function, for example colored regions, based on the determined distributions.

The determined 2D transfer function 107 is stored in classification unit 46 as a 2D table that maps each pair of input values (first intensity value, second intensity value) to a respective color value. In other embodiments, the transfer function may be stored in any suitable format. For example, the extent of regions 80, 82, 84 and 86 may be stored as a set of functions of first intensity and second intensity. For example, for the transfer function 107 shown in FIG. 7a set of triangles may be stored and each color value may be reconstructed from the triangles. Any appropriate table or function may be used.

Although in the present embodiment, the 2D transfer function 107 is calculated up front, in other embodiments the 2D transfer function 107 does not need to be calculated at this stage. The 2D transfer function 107 needed to render a particular view can be calculated on the fly (as and when required).

In some embodiments, the range of the 2D transfer function is clamped to a suitable data range to prevent the table from becoming too large. In some embodiments, the 2D transfer function is computed at a reduced resolution, and interpolation may be used during rendering to derive needed values.

The rendering unit 50 renders an image of a slice of the image data at stage 60. The resulting rendered image 108 includes information derived from both the non-contrast image data and the contrast-enhanced image data.

To render the image of the slice, the rendering unit 50 determines a set of points in the image volume, each corresponding to a respective pixel of the rendered image. The points are located on the slice of interest.

In the present embodiment, points on the slice may be determined in the registered non-contrast image data 103 or in the contrast-enhanced image data 101. The registered non-contrast image data 103 and contrast-enhanced image data 101 have the same coordinate system. In other embodiments, points on the slice are identified in the contrast-enhanced image data 101 and the deformation field 102 is used to determine corresponding points in the non-contrast image data 100.

For each pixel, the rendering unit 50 looks up a first intensity value for the corresponding point in the registered non-contrast image data 103 and a second intensity value for the corresponding point in the contrast-enhanced image data 101 (for example by interpolating the intensities of neighboring voxels). The rendering unit 50 then uses the first intensity value and second intensity value at the point to index the table. An output color for the pixel is determined. The output color for the pixel is the color value associated with the pair of intensities.

Output color=table(post,pre)

where table is the table representing the 2D transfer function, pre is the intensity of the point in the registered non-contrast image data 103 and post is the intensity of the point in the contrast-enhanced image data 101. Therefore the 2D transfer function 107 is used to color pixels based on the HU values of corresponding points in both volumes.

In the present embodiment a color is assigned to each pixel. In other embodiments, other optical properties may be assigned to each pixel, for example, brightness, texture, opacity, transparency, shading, a dull surface effect, or a shiny surface effect.

The rendered image 108 provides a fusion view which includes information from both the registered non-contrast image data 103 and the contrast-enhanced image data 101. The rendered image 108 may have greater information content than a conventional subtraction image.

By determining a plurality of regions and assigning different colors and/or optical properties to different regions, different tissue types and/or artifacts may be visually distinguished in the rendered image 108. A first tissue type or artifact may have intensities that fall within a first region of the joint histogram. A second tissue type or artifact may have intensities that fall within a second region of the joint histogram. By coloring points in the first region differently from points in the second region, the first tissue type or artifact may be visually distinguished from the second tissue type or artifact in the rendered image 108.

Figure 8:
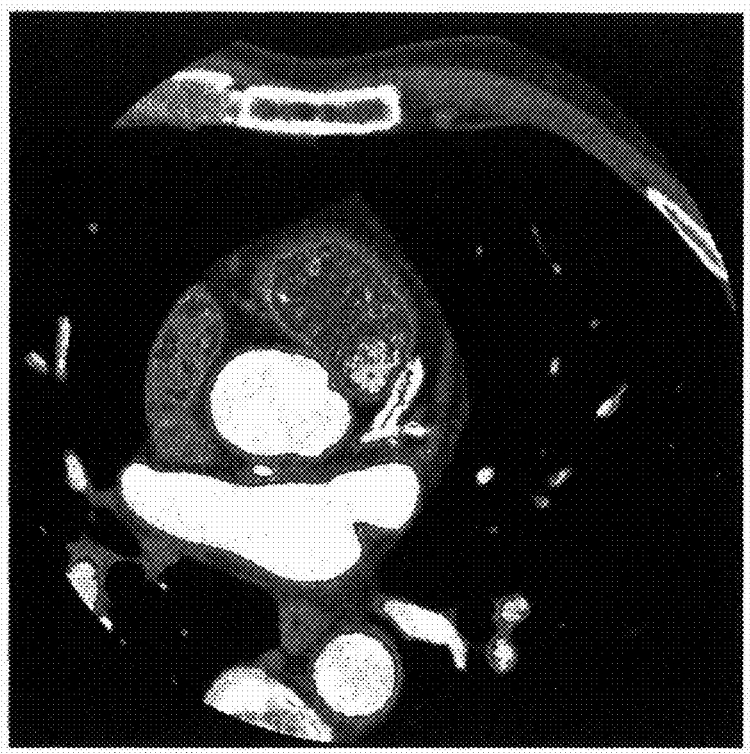
FIGS. 8 and 9 are medical images colored using a transfer function.

An example of a rendered image 108 is shown in FIG. 8. FIG. 8 shows an image of the aorta which has been colored using a transfer function that includes contrast uptake (red and yellow) and blooming (magenta) but not misregistration (green). Each pixel in the image of FIG. 8 is colored based on the first intensity value and second intensity value of a corresponding point in the registered non-contrast image data 103 and in the contrast-enhanced image data 101. Areas of low contrast uptake are colored in red. Areas of high contrast uptake are colored in yellow. Areas of contrast uptake where the initial intensity value is affected by a neighboring bloom artifact are colored in magenta.

Where there is no significant difference between the first intensity value and the second intensity value, grayscale values are used. The grayscale ramp is based on a blend of window levels in the non-contrast and contrast-enhanced image data.

Figure 9:
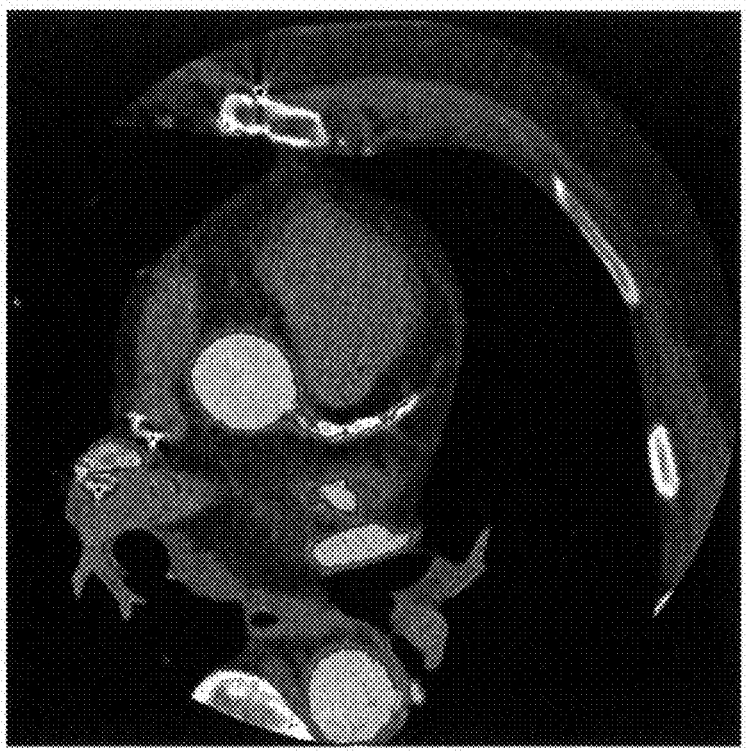

FIG. 9 is a further image of the aorta which has been colored using the 2D transfer function of FIG. 7a. Green areas show registration problems. In the example of FIG. 9, motion has occurred between the non-contrast scan and contrast-enhanced scan. Calcifications that have been affected by motion have a region of reduced intensity in the contrast-enhanced scan relative to the non-contrast scan. An incorrect registration of the calcification will result in green (decrease in intensity) on one side of the calcification and magenta or orange (increase in intensity) on the other side of the calcification. Magenta with little green means that there is no registration errors so the magenta area is likely to be representative of blooming, not misregistration.

Pre- and post-contrast data is combined in a single visualization. Generally speaking, the grayscale values in FIG. 9 correspond to unenhanced data that is not misregistered. In the present embodiment, the intensity of the grayscale values is a combination of intensity values from the pre-contrast data and the post-contrast data. In other embodiments, the grayscale values may be configured to show pre-contrast data, post-contrast data, or a blend between pre-contrast data and post-contrast data.

If only the grayscale ramp were present in the transfer function of FIG. 7a, the resulting image 108 would look like a conventional window-leveled MPR image of subtraction. By adding color using the 2D transfer function 107, more information may be provided to a user.

Although in the present embodiment, the rendered image 108 is a 2D slice, in other embodiments the rendered image may be any suitable type of image, for example a 2D slice, a 2D multi-planar rendering (MPR) image, a slab MPR image, a curved MPR image, a shaded volume rendering (SVR) image or an IP image.

In the present embodiment, color values are determined only for points on the slice which correspond to pixels of the rendered image 108. In other embodiments, color values (or other optical properties) may be determined for any appropriate voxels or points within the image.

In some embodiments, color values are obtained for points within a three-dimensional region of the contrast-enhanced image data 101 (or of the registered non-contrast image data 103) and the color value for each pixel of the rendered image 108 is obtained by combining color values for a plurality of points within the three-dimensional region. For example, an image of a slab may be obtained by combining points from multiple slices.

In the present embodiment, the 2D transfer function was determined using a joint histogram which was representative of all voxels in the contrast-enhanced image data 101 that have corresponding voxels in the registered non-contrast image data 103. In other embodiments, the joint histogram and/or the 2D transfer function may be determined using a subset of the image data. For example, in some embodiments, the joint histogram may plot only the voxels that are part of the slice to be rendered, and the 2D transfer function may be determined based on the voxels in the joint histogram. In some embodiments, the joint histogram may plot only voxels from a segmented region or segmented regions of the contrast-enhanced image data. In one example, the joint histogram plots only voxels that are in a region surrounding segmented coronary arteries.

In the embodiment of FIG. 5, the classification unit 46 automatically determines the 2D transfer function 107 from the joint histogram. In other embodiments, the classification unit 46 may load a pre-existing 2D transfer function and may not determine a transfer function from the image data.

In some embodiments, a 2D transfer function 107 is determined prior to the process of FIG. 5. For example, a 2D transfer function 107 may be determined using data from a different patient or patients than the patient whose scan is imaged in the process of FIG. 5. In some embodiments, a 2D transfer function is determined based on data from a large number of patients. This pre-determined transfer function 107 is then used in multiple instances of the process of FIG. 5. It has been found that in some circumstances a transfer function 107 that has been determined on one patient or on a group of patients may be used in visualization of data from a further patient.

In some embodiments, an initial 2D transfer function may be adapted to the scan under consideration by using 2D joint histogram analysis. Cluster analysis (for example, Gaussian Mixture Model fitting with k-means and Expectation Maximization) may be used to find the position and extent of a contrast spur, and automatic positioning of a red-yellow ramp may be performed.

A rendered image 108 that is colored using the transfer function may be displayed to the user, for example on display screen 36. In some embodiments, the user may control aspects of the visualization. The user may control the contribution of some or all of the assigned colors and/or optical properties to the rendered image 108. For example, the user may control the extent to which red, yellow, magenta and green are displayed in the image. In some circumstances the user may wish to remove these colors completely so that the user can view the underlying grayscale values. In some embodiments, removing red, yellow, magenta and green results in a traditional subtraction image, which the user may be used to viewing. The user may control the grayscale mapping so that the underlying image can be faded between non-contrast and contrast-enhanced scans.

The user may control the visualization by any suitable method, for example by using sliders, selecting pre-sets, or selecting between thumbnails. In some embodiments, a slider is used to control the levels of color (for example, green, yellow, red and magenta) that are applied to the image. The slider may control the importance of the color overlay. For example, a user may move a slider to reduce the amount of color in the image. In some embodiments, the user is able to control the level of each color individually. For example, if the user is particularly interested in finding misregistrations, the user may turn up the brightness of green areas of the image.

The grayscale mapping in the rendered image may represent the non-contrast image data, the contrast-enhanced image data, or a combination of the non-contrast and contrast-enhanced image data. In some embodiments, a slider is used to control the grayscale mapping. At one end of the slider, the colors are overlaid on a non-contrast image. At the other end of the slider, the colors are overlaid on a contrast-enhanced image. In the middle of the slider, the colors are overlaid on an image using a combination of contrast and non-contrast (for example, an image using subtraction values). The user may thereby control the relative contribution of first intensity value and second intensity value to the rendered image 108.

A visualization using colors determined by a transfer function may provide a more intuitive interpretation than traditional grayscale subtraction images. Calcium is still visible and may be easy to distinguish from contrast-enhanced blood. The color visualization may be easier to read than traditional grayscale subtraction images in some difficult cases. It may be faster to learn to read the colored visualization then to read grayscale subtraction images. The colored visualization may be of use when looking at chronic occlusions. In some circumstances, coronary artery disease may be easier to diagnose using the colored visualization.

The method of FIG. 5 may preserve both channels (contrast-enhanced and non-contrast) and therefore provide a visualization which retains more information than a normal subtraction image. By using a multichannel visualization rather than a scalar visualization, a user may be able to identify where they are not confident in the registration. The method of FIG. 5 may enable the visualization of blooming over the lumen.

Certain embodiments provide a method of visualizing contrast-enhanced vessels, comprising a registration engine generating a common frame of reference for two data sets from a single modality, and a rendering engine for sampling corresponding points in both data sets to generate a pair of data values, using the pair of data values to look up a two-dimensional transfer function to generate a processed data value, and using the processed data value while generating an image for display.

A first data set of the two data sets may be a contrast-enhanced CT data set. A second data set of the two data sets may be a non-contrast-enhanced CT data set. The rendering engine may be one of a 2D slice viewer, MPR, slab, curved slab, IP or SVR renderer.

The two-dimensional transfer function may be set up such that identified clusters in a joint histogram may be colored differently. The identified clusters may be indicative of contrast-enhanced blood, blooming artifacts and registration inaccuracies.

The two-dimensional transfer function may be set up to show a window-leveled view of a pre-contrast scan, a post-contrast scan, or a weighted blend of both a pre-contrast scan and a post-contrast scan.

In some embodiment, a 2D transfer function may be used when combining non-contrast image data and contrast-enhanced image data, and a 1D transfer function may be used when displaying non-contrast image data and contrast-enhanced image data separately.

Automatic determination of distributions in a joint histogram (for example a determination of lumen, unenhanced tissue, blooming and misregistration distributions as described above with reference to FIG. 5) may be used as an input to vessel segmentation processes as well as or instead of being used in rendering, as is now described for certain embodiments.

Figure 11:
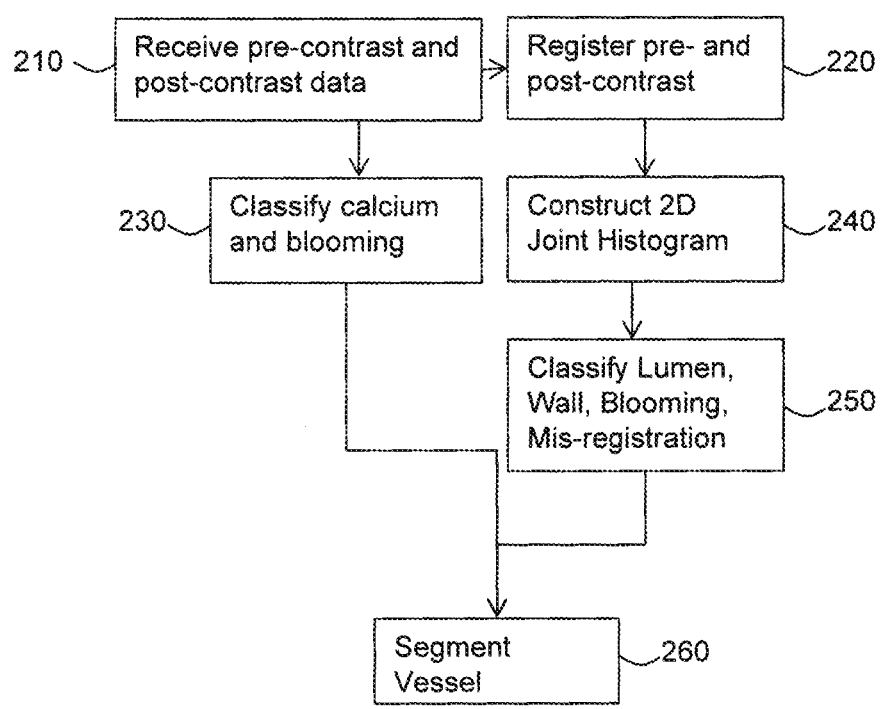
FIGS. 11 and 12 are flow charts, each illustrating in overview a process performed in accordance with an embodiment.

The system of FIG. 4 is configured to perform a series of stages as illustrated in overview in FIG. 11. A flow chart showing an embodiment in more detail is presented in FIG. 12.

Figure 12:
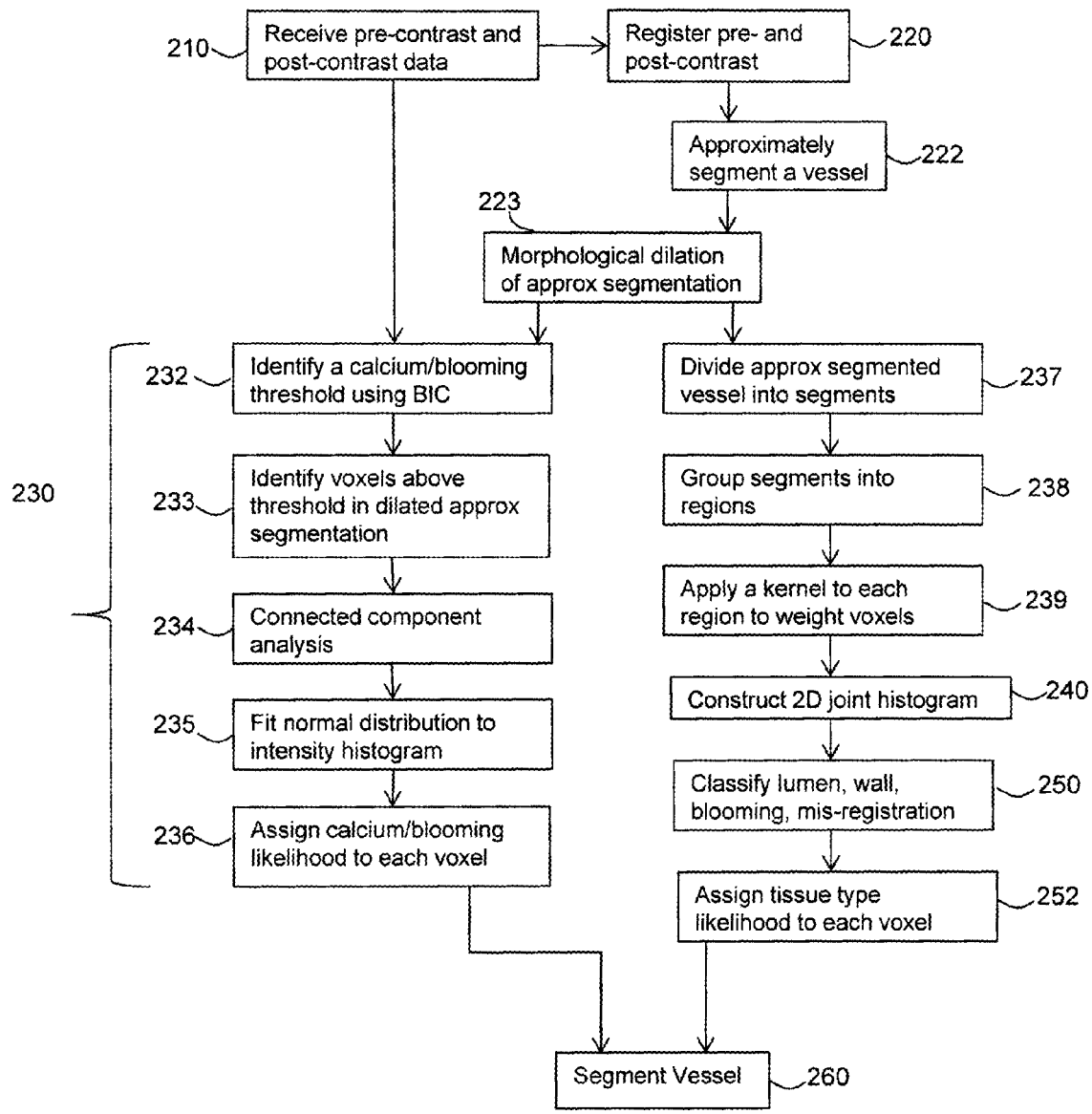

FIG. 11 and FIG. 12 each show a process in which tissue is classified from a 2D histogram, and a separate classification of calcium is also performed. However, in other embodiments, all tissue is classified from the 2D histogram and no separate calcium classification is performed.

At stage 210 of FIG. 11, the data receiving unit 44 receives non-contrast image data (pre-contrast data) 100 and contrast-enhanced image data (post-contrast data) 101. In the present embodiment, the non-contrast image data 100 is obtained from a calcium score scan of the coronary arteries of a patient and the contrast-enhanced image data 101 is contrast-enhanced image data obtained from a CCTA scan of the coronary arteries of the patient.

In other embodiments, any non-contrast image data and contrast-enhanced image data may be used. In further embodiments, the image data received by the data receiving unit may be image data from a DCE scan, for example image data that is representative of the hepatic vessels in a liver DCE scan.

The data receiving unit 44 passes the non-contrast image data 100 and contrast-enhanced image data 101 to the processing unit 45.

At stage 220, the registration unit 48 automatically registers the non-contrast image data 100 with the contrast image data 101. Any appropriate registration method may be used. In the present embodiment, the registration unit 48 performs a combination of non-rigid and rigid registration steps. The registration method used in the present embodiment is described in Razeto, M., Mohr, B., Arakita, K., Schuijf, J. D., Fuchs, A., Kühl, J. T., Chen, M. Y., and Kofoed, K. F., "Accurate, fully-automated registration of coronary arteries for volumetric CT digital subtraction angiography," Proc. SPIE 9034, 90343F-90343F-7 (2014).

At stage 230, the classification unit 46 classifies calcium and blooming in the non-contrast image data. Voxels in the non-contrast image data are separated into two classes: a first class of voxels that represent either calcium or blooming, and a second class of voxels that do not represent either calcium or blooming. In other embodiments, voxels in the non-contrast image data may be separated into three classes: a class representative of calcium, a class representative of blooming and a class representative of neither calcium nor blooming.

At stage 240, the classification unit 46 constructs a two-dimensional joint histogram of first and second intensity values from the non-contrast and contrast-enhanced image data, as described above with reference to FIG. 6.

At stage 250, the classification unit 46 performs an automatic classification of voxel pairs into lumen, wall, blooming and misregistration using the joint histogram. Any appropriate classification method in the joint histogram may be used.

At stage 260, the segmentation unit 52 segments the vessel using the classification of calcium and blooming from stage 230 and the classification of lumen, wall, blooming and misregistration from stage 250.

Stages 230 to 260 may comprise classification and segmentation processes that are the same as or similar to as described in U.S. patent application Ser. No. 14/099,092, which is incorporated herein by reference.

FIG. 12 is a more detailed flow chart illustrating the stages of a process of an embodiment.

As in the flow chart of FIG. 11, at stage 210 the data receiving unit 44 receives non-contrast image data and contrast-enhanced image data, and at stage 220 the registration unit 48 registers the non-contrast image data and contrast-enhanced image data. The registration unit 48 generates registered non-contrast image data 103 using the registration (in alternative embodiments, the registration unit 48 does not generate registered non-contrast image data 103 at this stage and instead points in the non-contrast image data 100 are looked up as required using the result of the registration).

At stage 222, the segmentation unit 52 approximately segments a vessel in the contrast-enhanced image data 101 using an efficient active contour algorithm. The approximate segmentation may be used to remove voxels that are representative of materials that are not of interest, for example voxels representative of air or of bone. The approximate segmentation may allow the vessel wall to be distinguished from other soft tissue.

In other embodiments, any appropriate segmentation method may be used to perform an approximate segmentation. The approximate segmentation technique may include a vessel tracking method, which may be any appropriate method of vessel tracking. In further embodiments, no approximate segmentation is performed.

The approximate segmentation results in an estimate of which voxels in the contrast-enhanced image data are part of the vessel. The estimate may not be accurate and may include some soft tissue surrounding the vessel. The segmentation unit 52 outputs a subset of voxels in the contrast-enhanced image data. The subset comprises the voxels that are part of the approximate segmentation of the vessel.

At stage 223, the classification unit 46 identifies a subset of voxels in the registered non-contrast image data 103 that corresponds to the subset of voxels in contrast-enhanced image data 101 that was determined by the approximate segmentation.

The classification unit 46 applies a morphological dilation to the approximate segmentation (in the present embodiment, a dilation by a factor of 2). The classification unit 56 identifies the resulting subset of the voxels of the registered non-contrast image data 103. The resulting subset of voxels in the non-contrast image data 100 after dilation is the subset of voxels that is used to perform the calcium and blooming classification.

In further embodiments, a different morphological dilation may be used, or no morphological dilation may be used.

At stage 230, the classification unit 46 performs a classification of calcium and blooming in the non-contrast image data 100. The classification of stage 230 comprises steps 232 to 236 of FIG. 12. In the present embodiment, the classification method is an unsupervised classification method. In other embodiments, any suitable classification method may be used, whether supervised or unsupervised.

At stage 232, the classification unit 46 uses the subset of voxels determined in the morphological dilation of stage 223. The classification unit 46 determines an intensity threshold which is used to divide calcium and blooming voxels from voxels that represent neither calcium nor blooming. In the present embodiment, the threshold is found by deciding between different candidate thresholds using a Bayesian Information Criterion (BIC) technique. In other embodiments, a different form of information criterion may be used, or any other suitable method of determining a threshold may be used.

The classification unit 46 determines a set of candidate threshold values. For example, the classification unit 46 may identify the maximum value and minimum value of voxel intensity occurring in the subset of voxels determined in the morphological dilation of stage 223 and determine a number of different candidate threshold values, where each candidate threshold value is greater than the minimum intensity value and less than the maximum intensity value.

The classification unit 46 defines a finite set of models. Each model uses a different one of the set of candidate thresholds to partition the subset of voxels from stage 223. A suitable distribution is fitted to the data in each of the two partitions, for example a Gaussian distribution. For each model, the classification unit 46 calculates the BIC on the two partitions or subgroups as a function of the threshold. The classification unit 46 thereby obtains a BIC measure for each of the finite set of models. The classification unit 46 generates a graph of BIC measure against threshold value. The classification unit 46 selects the model that corresponds to the maximum of the BIC measure graph as the model in which the threshold best divides the calcium and blooming voxels from the other voxels. The classification unit 46 sets the candidate threshold value corresponding to the maximum of the BIC measure graph as the threshold that will be used in further stages of the calcium and blooming classification.

At stage 233, the classification unit 46 applies the threshold from stage 232 to the subset of the non-contrast image data and identifies the voxels in the subset of voxels from stage 223 that are above the threshold. The classification unit 46 may flag or otherwise mark the identified voxels as voxels of calcium or blooming. In the present embodiment, the classification unit 46 defines a set of voxels that have been identified as calcium or blooming.

At stage 234, the classification unit 46 uses connected component analysis to identify a set of individual regions in the contrast-enhanced image data, each of which may be an individual calcium deposit and/or region of blooming. Each region comprises a plurality of connected voxels. A connected component analysis process is applied to the voxels that have been identified as representing calcium or blooming. The connected component analysis identifies each of the clusters of inter-connected voxels as separate regions. Any suitable connected component analysis process may be used to identify the regions of connected voxels.

The connected component analysis results in an identified set of discrete calcium or blooming regions within the subset of voxels from the non-contrast image data that was identified at stage 223.

At stage 235, the classification unit 46 fits the intensity distribution for each calcium region to a Gaussian using k-means and/or Expectation-Maximization (EM). The k-means algorithm is described by J B McQueen in "Some methods for classification and analysis of multivariate observations" (*Proceedings of the Fifth Symposium on Math, Statistics, and Probability*, pages 281-297, University of California Press, 1967) and by J Marroquin and F Girosi in "Some extension of the k-means algorithm for image segmentation and pattern recognition" (*AI Memo* 1390, Massachusetts Institute of Technology, Cambridge, Mass., 1993). The expectation-maximization (EM) algorithm is described by T K Moon in "The expectation-maximization algorithm" (*Signal Processing Magazine*, IEEE, vol. 13, pages 47-60, November 1996).

In further embodiments, any suitable fitting function may be used. In other embodiments, each intensity distribution is fitted to an alternative distribution rather than to a Gaussian.

At stage 236, the classification unit 46 defines for each voxel in the subset of non-contrast image data a likelihood that the voxel represents calcium or blooming, based on the fitted distributions. This concludes stage 230 (classification of calcium and blooming in the registered non-contrast image data 103).

Stage 237 may occur before, after, or at the same time as stage 230. At stage 237, the classification unit 46 uses the subset of voxels that was determined in the morphological dilation of stage 223 of FIG. 12. The classification unit 46 takes the subset of voxels that we was determined in the morphological dilation of stage 223, which is a dilation of the approximate segmentation of stage 222. The classification unit divides the vessel as represented by the subset of voxels into a plurality of sections along the length of the vessel. FIG. 13 shows a schematic cross-section through part of an imaged blood vessel 140, comprising a vessel wall 142 and a vessel lumen 144. The vessel has been divided into a plurality of adjacent sections 146, indicated by the dotted lines.

At stage 238 of FIG. 12, the classification unit 46 groups adjacent sections together into vessel regions, which in FIG. 13 each comprise five sections, having a small overlap between sections. At stage 239, the classification unit 46 applies a Gaussian kernel 150 to each vessel region, thus producing a set of weighted voxel values.

At stage 240, for each vessel region, the classification unit 46 constructs a two-dimensional joint histogram of the first and second intensity values (non-contrast and contrast-enhanced intensity values) of the voxels in the vessel region. The joint histogram may be similar to the joint histogram of FIG. 6.

At stage 250, the classification unit 46 determines means, variances, and weights of each of four distributions: lumen, wall, blooming and misregistration. Lumen, wall, blooming and misregistration distributions may be defined as described above with reference to FIG. 6. The assumption is made that each tissue type (or blooming or misregistration) has a 2D Gaussian distribution in the 2D joint histogram. In the present embodiment, the k-means algorithm is used in conjunction with the Expectation Maximization algorithm to determine the means, variances and weights of all four Gaussian distributions (thereby determining a location and extent for each corresponding cluster of points in the joint histogram). In other embodiments, any suitable technique may be used to determine a mean, variance and weight for each distribution. The distributions may not be Gaussian. More or fewer than four distributions may be determined, and the distributions may represent different tissue types and/or artifacts.

In the present embodiment, the classification unit 46 determines the mean, variance and weight for the vessel lumen and vessel wall Gaussian distributions in a given vessel region using the joint histogram for that vessel region. Classification of the lumen and wall is performed independently within each vessel region. However, for misregistration and blooming, there may be insufficient statistics to fit a Gaussian distribution in a particular vessel region. Therefore, distributions for misregistration and blooming are fitted on a joint histogram comprising voxels for the entire vessel tree.

In some cases, for the vessel kernel region, the statistics may be sufficient to fit the vessel lumen and the vessel wall but may not be sufficient to fit misregistration or blooming in the vessel kernel region. Therefore, in such cases in the present embodiment, blooming and misregistration may be fitted globally using the entire vessel tree.

In other embodiments, blooming or misregistration may be identified using fixed regions of the histogram that are offset from the classified lumen and/or wall distributions. For example, a distribution for blooming in the joint histogram of a given vessel kernel region may be determined by positioning a distribution of fixed size at a given distance from the center of the lumen distribution, the lumen distribution having been determined by fitting to the joint histogram for the vessel kernel region.

At stage 252, the classification unit 46 assigns likelihoods (or probabilities) for each of lumen, wall, blooming and misregistration to each voxel based on the likelihoods (or probabilities) that have resulted from each calculated vessel region.

In the present embodiment, the classification unit 46 defines for each voxel in the subset a likelihood that the voxel represents lumen, a likelihood that the voxel represents vessel wall, a likelihood that the voxel represents blooming, and a likelihood that the voxel represents a misregistration, according to the likelihoods of stage 250. Therefore the classification unit 46 constructs a likelihood that a given voxel with intensity I in the non-contrast image data and intensity J in the contrast-enhanced image data is of a given tissue type (or blooming or misregistration).

At stage 260, the segmentation unit 52 receives from the classification unit 46 the likelihoods or probabilities for calcium or blooming that were obtained at stage 236, and the classifications for lumen, wall, blooming and misregistration that were obtained at stage 252.

Distinguishing between lumen and calcium blooming allows for special treatment of the blooming class (for example, weighting or modeling). Some additional interpretation may be made of the blooming. For example blooming data may be used in a physical model, or in a model learned from data using machine learning techniques. Such model may help separate calcification and lumen and may lead to a more accurate segmentation, or a more accurate estimation of calcification, which may lead to a more accurate estimate of the degree of the stenosis.

Figure 10:
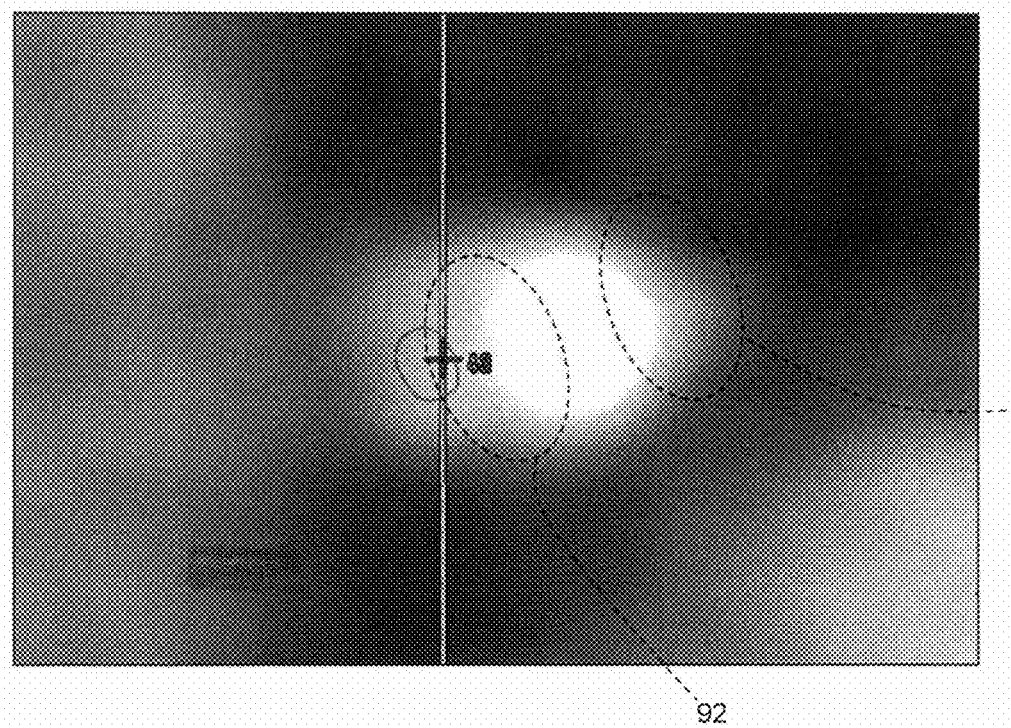
FIG. 10 is an image of a vessel lumen showing regions of blooming.

FIG. 10 shows a non-contrast image in which calcium blooming is present. The use of a joint histogram to separate lumen and blooming may allow blooming outside a vessel (for example, region 90 of FIG. 10) to be distinguished from blooming into the lumen (for example, region 92 of FIG. 10).

Once voxels have been assigned likelihoods or probabilities, those likelihoods or probabilities are used to segment voxels of each particular type from a data set that comprises intensity data. In the present embodiment, the data set from which voxels of each type are segmented is a combined data set which incorporates image data from both the registered non-contrast image data 103 and the contrast-enhanced image data 101.

In the present embodiment, the data set from which voxels are segmented comprises all of the intensities from the registered non-contrast image data 103 and the contrast-enhanced image data 101. The segmentation uses data from the whole data set and is not limited to the approximate segmentation. In other embodiments, the data set from which voxels are segmented comprises only the subset that was approximately segmented at stage 222 of FIG. 12, or any other appropriate subset.

Segmentation of the lumen is performed using a level-set approach. A level-set technique for segmentation of the lumen is described in Mohr B, Masood S, Plakas C, 2012, 'Accurate lumen segmentation and stenosis detection and quantification in coronary CTA', Proc. of MICCAI Workshop '3D Cardiovascular Imaging: a MICCAI Segmentation Challenge'. All the classifications (lumen, wall, misregistration and blooming from the joint histogram, and calcium and blooming from the non-contrast image data) are used to weight a speed function driving a level-set. The speed function uses all the determined likelihoods. Therefore, the speed function is determined in dependence on the obtained classifications.

The level-set is solved to achieve a segmentation. The level-set process assigns each individual voxel to a tissue type (or misregistration or blooming). The segmentation unit 52 extracts those voxels that are assigned to vessel lumen.

The segmentation unit 52 determines an estimated confidence level for the segmentation based on the classification of misregistration. In some embodiments, if a large number of voxels are classified in the misregistration class, the estimated confidence level is low. If only a small number of voxels are classified in the misregistration class, the estimated confidence level is high.

The classification of misregistration may allow an estimated confidence to be applied to the segmentation. An identification of misregistration may prevent abnormal segmentation.

In alternative embodiments, any appropriate segmentation method may be used in stage 260, for example an active contour method.

The results of the segmentation may be displayed to a user. The results of the segmentation may be fed into any appropriate further process.

In the present embodiment, stages 222 to 260 of the process of FIG. 12 describe the segmentation of a single vessel. In alternative embodiments, stages 222 to 260 of the process of FIG. 12 may be repeated for further vessels in the image data.

Improving the accuracy and robustness of automated segmentation may increase clinical confidence. Improving the accuracy and robustness of automated segmentation may also allow for robust automated derivative techniques, for example stenosis detection and quantification.

The use of a 2D distribution (for example, a joint histogram approach) may identify more classes than may be identified using a 1D distribution. In the present embodiment, blooming may be separated from lumen in the joint histogram because two dimensions are used. Identifying lumen, wall, misregistration and blooming classes using a joint histogram may allow for better separation of lumen and wall than may be achieved when using 1D distributions to separate lumen and wall (with no identification of misregistration and blooming).

Certain embodiments provide a method of segmenting vessels using both pre- and post-contrast data, the method comprising constructing a 2D joint histogram from registered pre- and post-contrast data and classifying lumen, wall, blooming and misregistration using the 2D joint histogram.

An approximate vessel segmentation may be performed. Classification of the tissue may be confined to the approximate vessel segmentation. The approximate segmentation may be divided into regions (which may be overlapping regions) based on a kernel. Classification of the lumen and vessel wall may be performed independently within each region by fitting distributions using an unsupervised learning technique.

The distributions may be assumed to be Gaussian. The unsupervised learning technique may be k-means and/or Expectation Maximization.

Segmentation may be performed using a level-set with a speed function balancing the tissue classification likelihood distributions. Specific treatment may be applied to the blooming class (for example, additional modeling, weighting, etc.) The misregistration classification may contribute to the estimated confidence of the segmentation. Blooming may be classified separately when contributing to the lumen signal and otherwise. Blooming, misregistration etc. may be identified (assumed) using fixed regions offset from the classified lumen/wall distributions.

Although embodiments have been described in relation to the rendering or segmentation of CT data, embodiments may be used to render or segment any suitable type of medical image data, for example X-ray data, MRI data, PET data or SPECT data. Medical image data may include veterinary image data. Although embodiments have been described in relation to data from non-contrast images and subtraction images, any image types from which different features can be classified may be used. The medical image data may relate to any part of the body.

Although some embodiments described herein refer to a two-dimensional distribution of first intensity and second intensity (a two-dimensional joint histogram), in other embodiments a distribution having more than two dimensions may be used.

Although the apparatus of FIG. 4 is configured to perform both the visualization method of FIG. 5 and the segmentation method of FIG. 12, in other embodiments an apparatus may be configured to perform the method of FIG. 5 and not the method of FIG. 12 (for example, the segmentation unit 52 may be omitted from the processing unit 45) or an apparatus may be configured to perform the method of FIG. 12 and not the method of FIG. 5 (for example, the rendering unit 50 may be omitted from the processing unit 45).

Whilst particular units have been described herein, in alternative embodiments functionality of one or more of these units can be provided by a single unit, processing resource or other component, or functionality provided by a single unit can be provided by two or more units in combination. Reference to a single unit encompasses multiple components providing the functionality of that unit, whether or not such components are remote from one another, and reference to multiple units encompasses a single component providing the functionality of those units.

Whilst certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image data processing apparatus, comprising:
processing circuitry configured to
   receive medical image data representative of a region of a subject, wherein the medical image data comprises, for each of a plurality of points in the region of the subject, a first intensity value and a second intensity value, each point having a respective position on an at least two-dimensional distribution of first intensity against second intensity, and wherein the first intensity values comprise intensity values from a non-contrast scan and the second intensity values comprise intensity values from a contrast scan; and
   render or segment the medical image data in dependence on the positions of points in the at least two-dimensional distribution, wherein the rendering or segmenting of the medical image data comprises determining a plurality of regions, including a misalignment region, wherein the misalignment region includes points for which the second intensity value from the contrast scan is smaller than the first intensity value from the non-contrast scan.

2. The apparatus according to claim 1, wherein the rendering of the medical image data comprises generating a rendered image in which points that are representative of a first tissue type or artifact are visually distinguished from points that are representative of a second, different tissue type or artifact; and wherein the points representative of the first tissue type or artifact have positions in a first region of the at least two-dimensional distribution and the points representative of the second tissue type or artifact have positions in a second, different region of the at least two-dimensional distribution.

3. The apparatus according to claim 2, wherein the first tissue type or artifact comprises one of lumen, unenhanced tissue, misregistration, and blooming, and the second tissue type or artifact comprises a different one of lumen, unenhanced tissue, misregistration, and blooming.

4. The apparatus according to claim 2, wherein the generating of a rendered image in which points that are representative of a first tissue type or artifact are visually distinguished from points that are representative of a second, different tissue type or artifact comprises assigning at least one of a first color and an optical property to each of a plurality of points that are representative of the first tissue type or artifact and assigning at least one of a second, different color and an optical property to each of a plurality of points that are representative of the second tissue type or artifact.

5. The apparatus according to claim 4, wherein the optical property comprises at least one of brightness, texture, opacity, transparency, shading, a dull surface effect, and a shiny surface effect.

6. The apparatus according to claim 4, wherein the assigning of at least one of the color and the optical property to each point uses at least one table or function which maps at least one of different colors and different optical properties to different regions of the two-dimensional distribution.

7. The apparatus according to claim 6, wherein the rendering of the medical image data further comprises determining a location and extent for each cluster of points of a plurality of clusters of points on the two-dimensional distribution and determining the at least one table or function in dependence on the determined cluster locations and extents.

8. The apparatus according to claim 6 wherein the at least one table or function comprises at least one of a 2D transfer function and a look-up table.

9. The apparatus according to claim 4, wherein the processing circuitry is further configured to alter the rendered image in response to user input so as to change a contribution of at least one of the colors and the optical properties to at least part of the rendered image.

10. The apparatus according to claim 2, wherein the processing circuitry is further configured to alter the rendered image in response to user input so as to change a relative contribution of first intensity values and of second intensity values to at least part of the rendered image.

11. The apparatus according to claim 2, wherein the rendered image comprises at least one of a 2D slice, a 2D multi-planar rendering (MPR) image, a MPR plus slab image, a curved MPR image, a shaded volume rendering (SVR) image, and an intensity projection (IP) image.

12. The apparatus according to claim 1, wherein the segmenting of the medical image data comprises:

determining a respective cluster region in respect of each of a plurality of clusters of the points on the two-dimensional distribution, wherein each cluster of points is associated with a respective tissue type or artifact;

obtaining at least one classification for each point based on whether the position of the point on the two-dimensional distribution falls inside one or more of the determined cluster regions; and segmenting at least one structure in the medical image data in dependence on the obtained classifications.

13. The apparatus according to claim 12, wherein the plurality of clusters of points comprises at least one cluster of points that is representative of lumen and at least one cluster of points that is representative of at least one of misregistration and blooming.

14. The apparatus according to claim 12, wherein the classification comprises a probability that each point is representative of at least one of misregistration or blooming and the segmenting of the structure is in dependence on the probability that each point is representative of at least one of misregistration or blooming.

15. The apparatus according to claim 12, wherein the segmenting of the at least one structure comprises performing a level set, and a speed function of the level set is determined in dependence on the obtained classifications.

16. The apparatus according to claim 12, wherein determining of the cluster regions comprises fitting a respective two-dimensional function to each cluster.

17. The apparatus according to claim 12, wherein the at least one classification comprises a probability that each point is representative of misregistration, and wherein the processing circuitry is further configured to determine a confidence level for the segmenting in dependence on the probability that each point is representative of misregistration.

18. The apparatus according to claim 12, wherein the segmenting of the at least one structure further depends on a classification of at least one of calcium and blooming from the first intensity values.

19. The apparatus according to claim 12, wherein each structure comprises a vessel.

20. The apparatus according to claim 1, wherein the medical image data comprises at least one of CT, MR, PET, and SPECT data.

21. The apparatus according to claim 1, wherein the at least two-dimensional distribution comprises a two-dimensional joint histogram.

22. An image processing method, comprising:

receiving medical image data representative of a region of a subject, wherein the medical image data comprises, for each of a plurality of points in the region of the subject a first intensity value and a second intensity value, each point having a respective position on an at least two-dimensional distribution of first intensity against second intensity, and wherein the first intensity values comprise intensity values from a non-contrast scan and the second intensity values comprise intensity values from a contrast scan; and rendering or segmenting the medical image data in dependence on the positions of points in the at least two-dimensional distribution, wherein the rendering or segmenting of the medical image data comprises determining a plurality of regions, including a misalignment region, wherein the misalignment region includes points for which the second intensity value from the contrast scan is smaller than the first intensity value from the non-contrast scan.

23. The method according to claim 22, wherein the rendering of the medical image data comprises generating a rendered image in which points that are representative of a first tissue type or artifact are visually distinguished from points that are representative of a second, different tissue type or artifact; and wherein points representative of the first tissue type or artifact have positions in a first region of the at least two-dimensional distribution and points representative of the second tissue type or artifact have positions in a second, different region of the at least two-dimensional distribution.

24. The method according to claim 22, wherein the segmenting of the medical image data comprises:

determining a respective cluster region in respect of each of a plurality of clusters of the points on the two-dimensional distribution, wherein each cluster of points is associated with a respective tissue type or artifact;

obtaining at least one classification for each point based on whether the position of the point on the two-dimensional distribution falls inside the determined extent of at least one of the clusters of points; and segmenting at least one structure in the medical image data in dependence on the obtained classifications.

25. A computer program product comprising a non-transitory storage medium storing instructions that are executable by processing circuitry to perform a method according to claim 22.

* * * * *